US011927776B2

(12) United States Patent
Ojala et al.

(10) Patent No.: US 11,927,776 B2
(45) Date of Patent: Mar. 12, 2024

(54) OPTICAL METHOD AND SYSTEM FOR LIGHT FIELD DISPLAYS BASED ON BEAMS WITH EXTENDED DEPTH OF FOCUS

(71) Applicant: InterDigital Madison Patent Holdings, SAS, Paris (FR)

(72) Inventors: Kai Ojala, Oulu (FI); Jukka-Tapani Makinen, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 123 days.

(21) Appl. No.: 17/433,541

(22) PCT Filed: Feb. 27, 2020

(86) PCT No.: PCT/US2020/020191
§ 371 (c)(1),
(2) Date: Aug. 24, 2021

(87) PCT Pub. No.: WO2020/185414
PCT Pub. Date: Sep. 17, 2020

(65) Prior Publication Data
US 2022/0155611 A1    May 19, 2022

Related U.S. Application Data

(60) Provisional application No. 62/815,853, filed on Mar. 8, 2019.

(51) Int. Cl.
*G02B 27/00* (2006.01)
*G02B 27/30* (2006.01)
(Continued)

(52) U.S. Cl.
CPC ......... *G02B 30/27* (2020.01); *G02B 27/0087* (2013.01); *G02B 27/30* (2013.01); *G02F 1/0311* (2013.01)

(58) Field of Classification Search
CPC .. G02B 30/27; G02B 27/0087; G02B 3/0006; G02B 27/0075
See application file for complete search history.

(56) References Cited

U.S. PATENT DOCUMENTS 5,080,456 A    1/1992  Katz
5,331,143 A    7/1994  Marom
(Continued)

FOREIGN PATENT DOCUMENTS

CN    108169921 A    6/2018
CN    108700751 A    10/2018
(Continued)

OTHER PUBLICATIONS

Templier, et al., "A Novel Process for Fabricating High-Resolution and Very Small Pixel-pitch GaN LED Microdisplays", SID Symposium Digest of Technical Papers, vol. 48, No. 1, (2017), pp. 268-271.
(Continued)

*Primary Examiner* — Joseph P Martinez
(74) *Attorney, Agent, or Firm* — Smadar Gefen

(57) ABSTRACT

Systems and methods are described for providing a 3D display, such as a light-field display. In some embodiments, a display device includes a light-emitting layer that includes a plurality of separately-controllable pixels. A lens structure overlays the light-emitting layer. The lens structure includes an array of collimating optical elements. A phase-modifying layer is positioned between the light emitting layer and the lens structure. The pixels of the light emitting layer are used in generating spatial emission patterns that work in unison with the phase-modifying layer in order to generate beams of light through the collimating optical elements with extended focus depths. Multiple beams are used to generate voxels at various distances from the display surface with the correct eye convergence for the viewer. Beams with
(Continued)

extended focus depths may be used to generate the correct eye retinal focus cues.

19 Claims, 17 Drawing Sheets

(51) Int. Cl.
  *G02B 30/27*   (2020.01)
  *G02F 1/03*    (2006.01)

(56) References Cited

U.S. PATENT DOCUMENTS

| | | | |
|---|---|---|---|
| 5,801,799 | A | 9/1998 | Chen |
| 6,719,204 | B2 | 4/2004 | Li |
| 6,842,297 | B2 | 1/2005 | Dowski, Jr. |
| 6,969,003 | B2 | 11/2005 | Havens |
| 7,063,261 | B2 | 6/2006 | Igor |
| 7,224,538 | B2 | 5/2007 | Igor |
| 7,436,595 | B2 | 10/2008 | Cathey, Jr. |
| 7,518,149 | B2 | 4/2009 | Maaskant |
| 7,554,750 | B2 | 6/2009 | George |
| 7,569,981 | B1 | 8/2009 | Ciancanelli |
| 7,994,527 | B2 | 8/2011 | Denbaars |
| 8,678,599 | B2 | 3/2014 | Gollier |
| 9,264,696 | B2 | 2/2016 | Sileira |
| 2004/0145808 | A1 | 7/2004 | Cathey |
| 2013/0070322 | A1 | 3/2013 | Fritz |
| 2013/0256418 | A1 | 10/2013 | Havens |
| 2016/0105668 | A1 | 4/2016 | Fang |
| 2016/0377850 | A1 | 12/2016 | Anhut |
| 2018/0236596 | A1 | 8/2018 | Ihlemann |
| 2018/0343443 | A1* | 11/2018 | Perreault ............ H04N 13/305 |

FOREIGN PATENT DOCUMENTS

| | | |
|---|---|---|
| WO | 2015083162 A1 | 6/2015 |
| WO | WO2019040484 A1 | 2/2019 |
| WO | 2019164745 | 8/2019 |

OTHER PUBLICATIONS

International Search Report and Written Opinion of the International Searching Authority for PCT/US2020/020191 dated Jun. 9, 2020, 12 pages.
International Preliminary Report on Patentability for PCT/US2020/020191 dated Aug. 25, 2021, 8 pages.
Lee, Vincent W., et al. "Micro-LED Technologies and Applications." Information Display, 2016, vol. 32, No. 6, pp. 16-23 (8 pages).
Mcmanamon, Paul F., et al. "A review of phased array steering for narrow-band electrooptical systems." Proceedings of the IEEE, vol. 97, No. 6, 2009, pp. 1078-1096 (19 pages).
Love, Gordon D., et al. "High-speed switchable lens enables the development of a volumetric stereoscopic display." Optics Express, vol. 17, No. 18, 2009, pp. 15716-15725 (10 pages).
Matsuda, Nathan, et al. "Focal surface displays." ACM Transactions on Graphics (TOG), 2017, vol. 36, No. 4, pp. 1-14 (14 pages).
Dowski, Jr., Edward R. et al. "Extended depth of field through wave-front coding." Applied Optics, vol. 34, No. 11, 1995, pp. 1859-1866 (8 pages).
Pätz, Daniel, et al. "Wave-front Coding for increased depth of field of optical systems." In: DGaO Proceedings, 2009 (2 pages).
Sung, Hsin-Yueh, et al. "Design of mobile phone lens with extended depth of field based on point-spread function focus invariance." In: Novel Optical Systems Design and Optimization XI, vol. 7061, International Society for Optics and Photonics, 2008, pp. 706107-1-706107-11 (11 pages).
Castro, Albertina, et al. "Integral imaging with large depth of field using an asymmetric phase mask." Optics Express, 2007, vol. 15, No. 16, pp. 10266-10273 (8 pages).
Wang, Jingang, et al. "Enhanced depth of field in integral imaging for 3D display with a cubic phase plate coded camera array." Journal of Display Technology, 2012, vol. 8, No. 10, pp. 577-581 (5 pages).
Boddeti, Vishnu Naresh, et al. "Extended-depth-of-field iris recognition using unrestored wavefront-coded imagery." IEEE Transactions on Systems, Man, and Cybernetics—Part A: Systems and Humans, 2010, vol. 40, No. 3, pp. 495-508 (14 pages).
Le, Van Nhu, et al. "To extend the depth of field by using the asymmetrical phase mask and its conjugation phase mask in wavefront coding imaging systems". Applied Optics, vol. 54, No. 12, 2015, pp. 3630-3634 (5 pages).

* cited by examiner

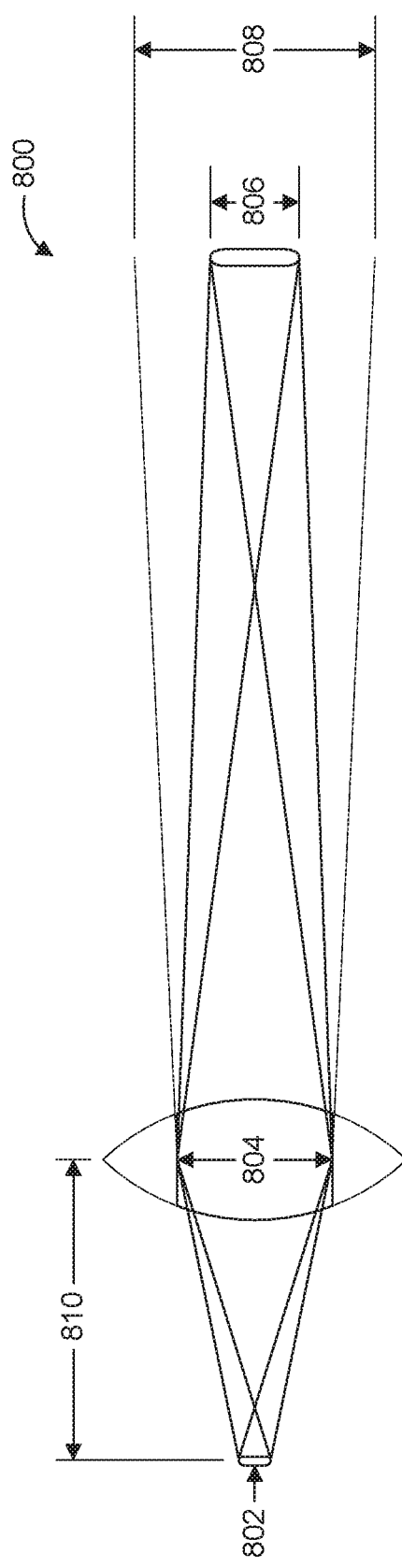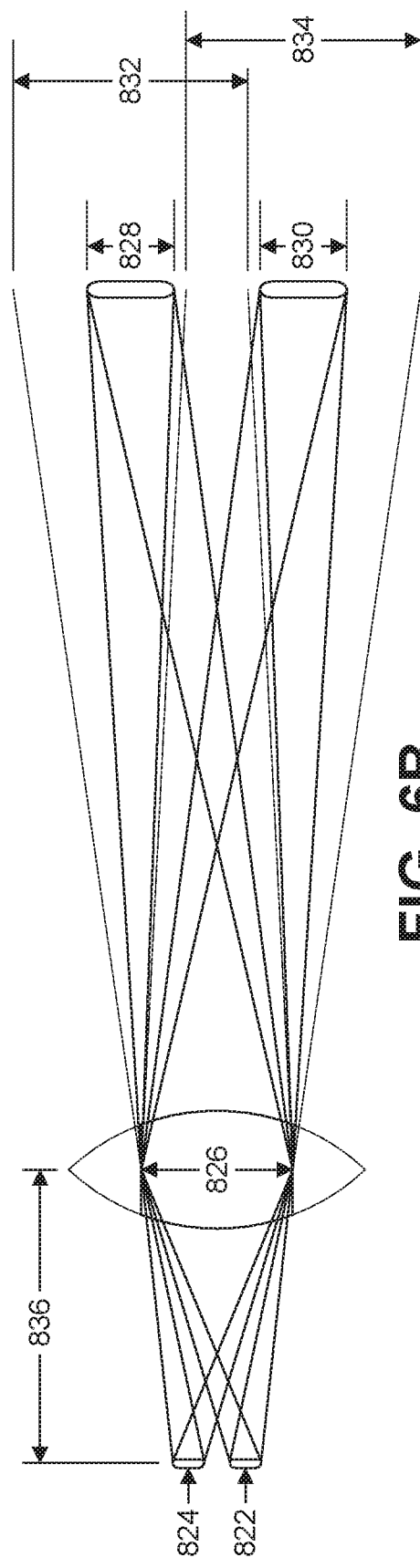

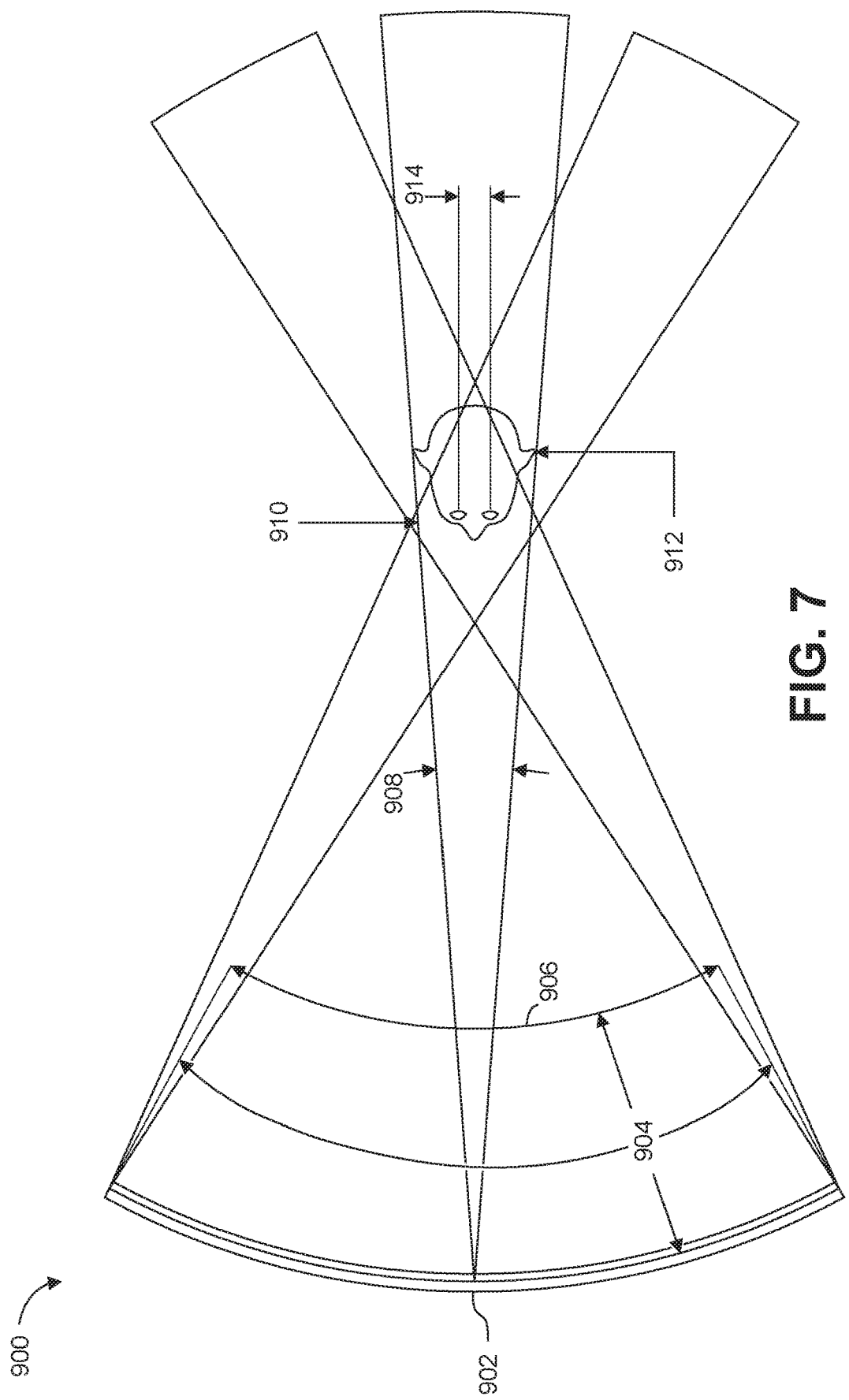

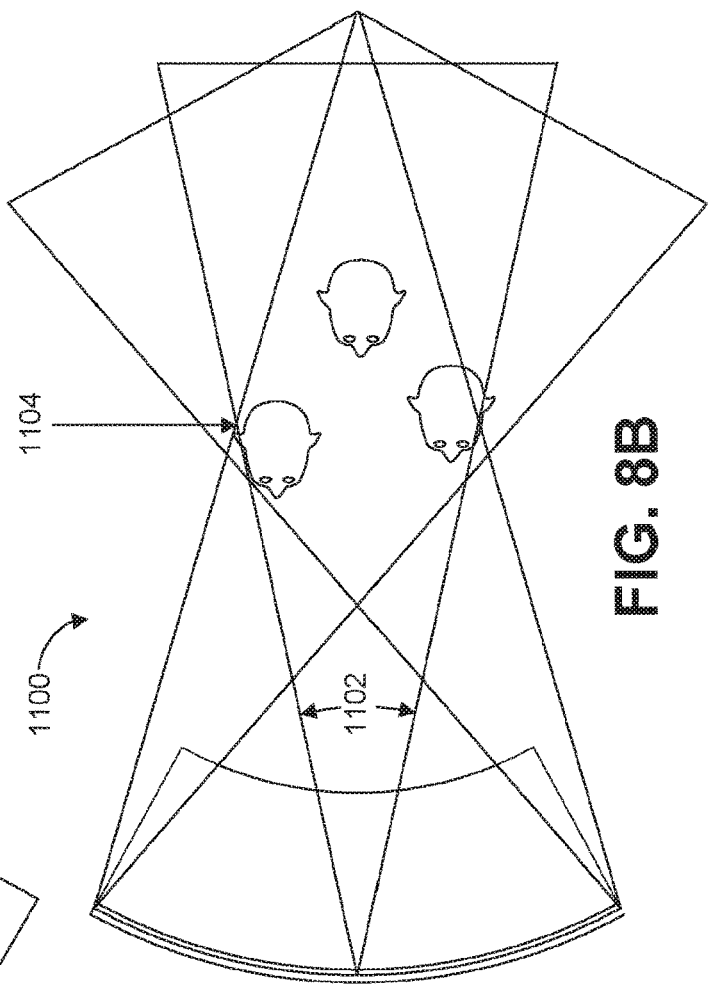
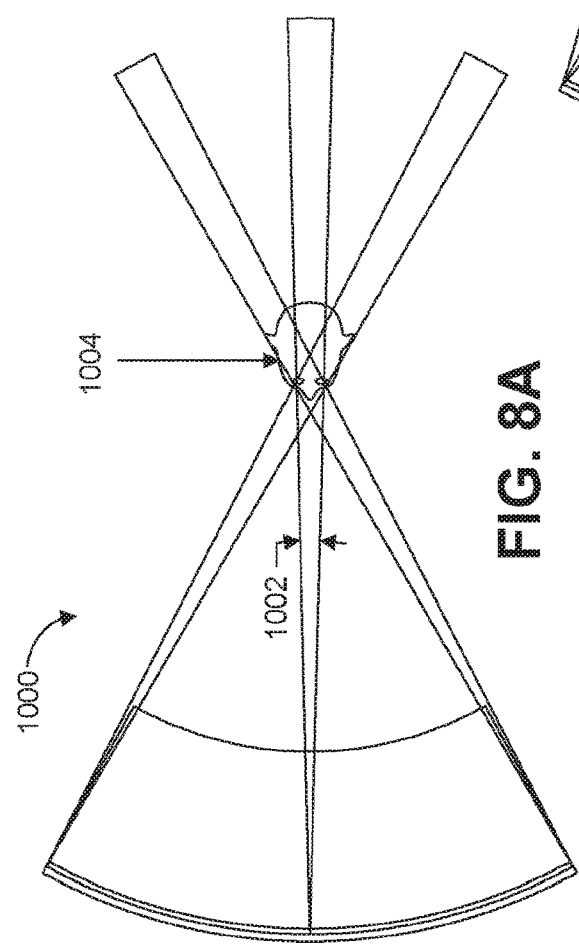
FIG. 8A
FIG. 8B

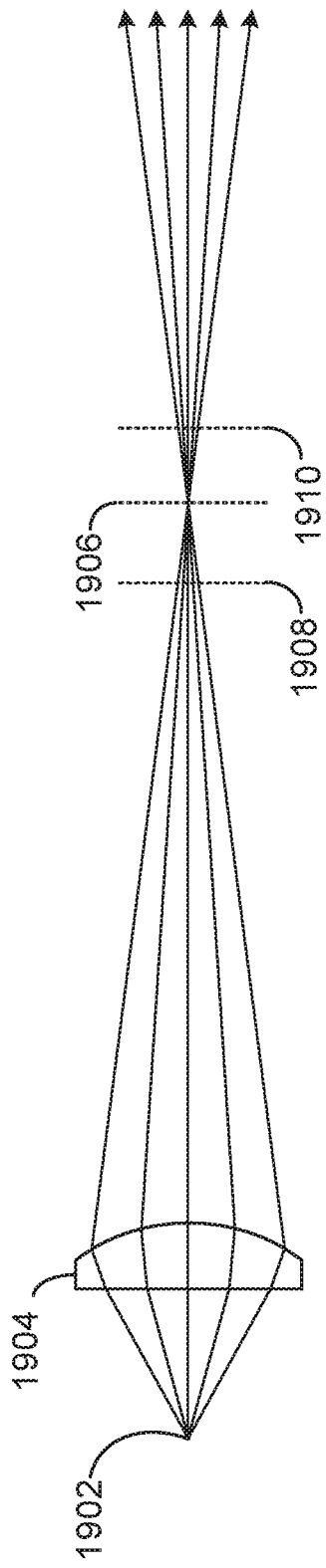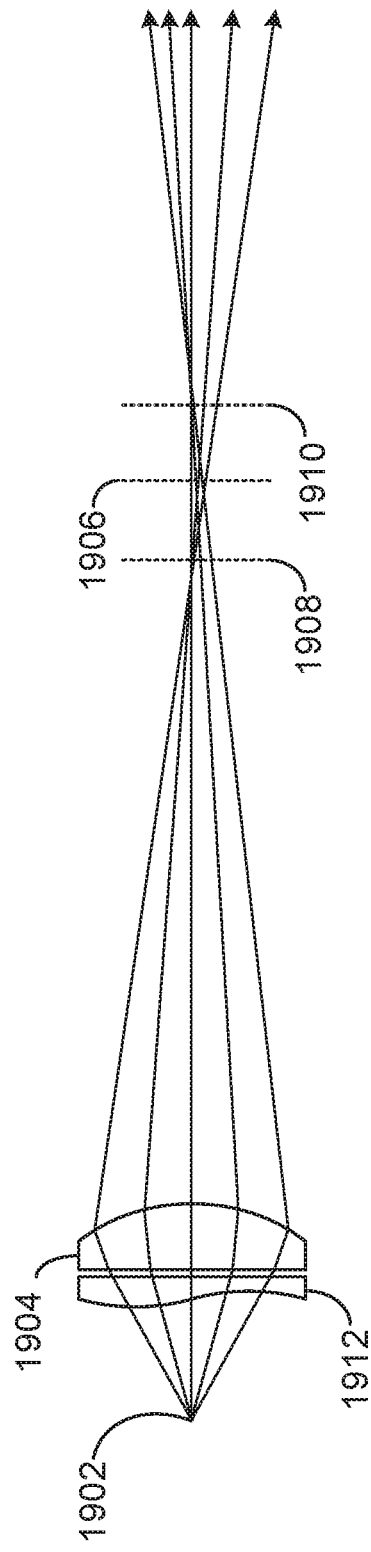

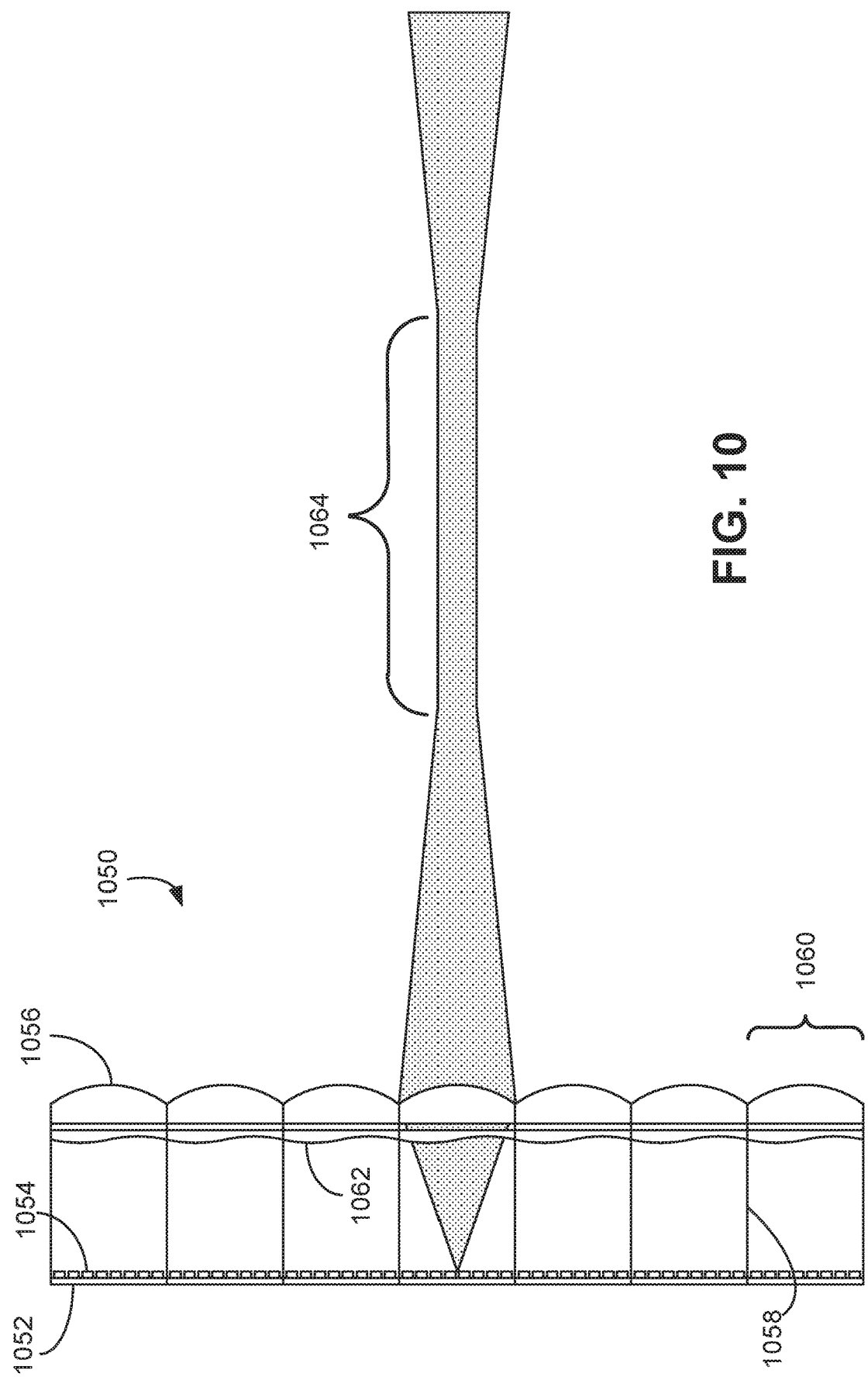

OPTICAL METHOD AND SYSTEM FOR LIGHT FIELD DISPLAYS BASED ON BEAMS WITH EXTENDED DEPTH OF FOCUS

CROSS-REFERENCE TO RELATED APPLICATIONS

The present application is a national stage application under 35 U.S.C. § 371 of International Application No. PCT/US2020/020191, entitled "OPTICAL METHOD AND SYSTEM FOR DISPLAYS BASED ON BEAMS WITH EXTENDED DEPTH OF FOCUS" filed on Feb. 27, 2020, which claims benefit under 35 U.S.C. § 119(e) from U.S. Provisional Patent Application Serial No. 62/815,853, entitled "Optical Method and System for Light Field Displays Based on Beams with Extended Depth of Focus," filed Mar. 8, 2019, which is hereby incorporated by reference in its entirety.

BACKGROUND

Different 3D displays can be classified on the basis of their form factors into different categories. Head-mounted devices (HMD) occupy less space than goggleless solutions, which also means that they can be made with smaller components and less materials making them relatively low cost. However, as head mounted VR goggles and smart glasses are single-user devices, they do not allow shared experiences as naturally as goggleless solutions. Volumetric 3D displays take space from all three spatial directions and generally call for a lot of physical material making these systems easily heavy, expensive to manufacture and difficult to transport. Due to the heavy use of materials, the volumetric displays also tend to have small "windows" and limited field-of view (FOV). Screen-based 3D displays typically have one large but flat component, which is the screen and a system that projects the image(s) over free space from a distance. These systems can be made more compact for transportation and they also cover much larger FOVs than e.g. volumetric displays. These systems can be complex and expensive as they call for projection subassemblies and e.g., accurate alignment between the different parts, making them best for professional use cases. Flat form-factor 3D displays may require a lot of space in two spatial directions, but as the third direction is only virtual, they are relatively easy to transport to and assemble in different environments. As the devices are flat, at least some optical components used in them are more likely to be manufactured in sheet or roll format making them relatively low cost in large volumes.

The human mind perceives and determines depths of observed objects in part by receiving signals from muscles used to orient each eye. The brain associates the relative angular orientations of the eyes with the determined depths of focus. Correct focus cues give rise to a natural blur on objects outside of an observed focal plane and a natural dynamic parallax effect. One type of 3D display capable of providing correct focus cues uses volumetric display techniques that can produce 3D images in true 3D space. Each "voxel" of a 3D image is located physically at the spatial position where it is supposed to be and reflects or emits light from that position toward the observers to form a real image in the eyes of viewers. The main problems with 3D volumetric displays are their low resolution, large physical size and expensive manufacturing costs. These issues make them too cumbersome to use outside of special cases e.g., product displays, museums, shows, etc. Another type of 3D display device capable of providing correct retinal focus cues is the holographic display. Holographic displays aim to reconstruct whole light wavefronts scattered from objects in natural settings. The main problem with this technology is a lack of suitable Spatial Light Modulator (SLM) component that could be used in the creation of the extremely detailed wavefronts.

A further type of 3D display technology capable of providing natural retinal focus cues is called the Light Field (LF) display. LF display systems are designed to create so-called light fields that represent light rays travelling in space to all directions. LF systems aim to control light emissions both in spatial and angular domains, unlike the conventional stereoscopic 3D displays that can basically only control the spatial domain with higher pixel densities. There are at least two fundamentally different ways to create light fields. In a first approach, parallax is created across each individual eye of the viewer producing the correct retinal blur corresponding to the 3D location of the object being viewed. This can be done by presenting multiple views per single eye. The second approach is a multi-focal-plane approach, in which an object's image is projected to an appropriate focal plane corresponding to its 3D location. Many light field displays use one of these two approaches.

The vergence-accommodation conflict (VAC) is one issue with current stereoscopic 3D displays. A flat form-factor LF 3D display may address this issue by producing both the correct eye convergence and correct focus angles simultaneously. In current consumer displays, an image point lies on a surface of a display, and only one illuminated pixel visible to both eyes is needed to represent the point correctly. Both eyes are focused and converged to the same point. In the case of parallax-barrier 3D displays, two clusters of pixels are illuminated to represent the single point correctly. In addition, the direction of the light rays from these two spatially separated pixel clusters are controlled in such a way that the emitted light is visible only to the correct eye, thus enabling the eyes to converge to the same single virtual point.

In current relatively low-density multi-view imaging displays, the views change in a coarse stepwise fashion as the viewer moves in front of the device. This lowers the quality of 3D experience and can even cause a complete breakdown of 3D perception. In order to mitigate this problem (together with the VAC), some Super Multi View (SMV) techniques have been tested with as many as 512 views. The idea is to generate an extremely large number of views so as to make any transition between two viewpoints very smooth. If the light from at least two images from slightly different viewpoints enters the eye pupil simultaneously, a much more realistic visual experience follows. In this case, motion parallax effects resemble the natural conditions better as the brain unconsciously predicts the image change due to motion. The SMV condition can be met by reducing the interval between two views at the correct viewing distance to a smaller value than the size of the eye pupil. The maximum angular density that can be achieved with SMV displays is limited by diffraction and there is an inverse relationship between spatial resolution (pixel size) and angular resolution. Diffraction increases the angular spread of a light beam passing through an aperture and this effect may be taken into account in the design of very high density SMV displays.

SUMMARY

In some embodiments, an image display apparatus includes a plurality of projection cells. The projection cells may be arranged in a two-dimensional array. A plurality of the projection cells include: an addressable array of light-emitting elements; a converging optical element (which may be a collimating lens) along an optical path from the light-emitting elements to an exterior of the display apparatus; and a phase-modifying optical element along the optical path.

The phase modifying element may be a phase plate such as a cubic phase plate, a quartic phase plate, an exponential phase plate, a logarithmic phase plate, or a sinusoidal phase plate.

In some embodiments, the phase-modifying optical element has a surface with a rectangularly separable form. In some such embodiments, the phase-modifying optical element has a surface with a form representable by z=f(x)−f(y), where z is a position along an optical axis and x and y are positions along axes orthogonal to z and to one another.

In some embodiments, the phase-modifying layer has a surface in 2D rectangularly or multiple sector separable forms.

In some embodiments, the phase-modifying optical element is not rotationally symmetric.

In some embodiments, the phase-modifying optical element is a first surface of a combined optical element and the converging lens is a second surface of the combined optical element.

Some embodiments further include baffles for blocking light between adjacent projection cells.

In some embodiments, an image display method includes selectively emitting light from at least one light-emitting element in an addressable array of light-emitting elements, modifying the phase of the light with a phase-modifying optical element, and substantially collimating the phase-modified light.

BRIEF DESCRIPTION OF THE DRAWINGS

FIG. 6A illustrates the combined effects of geometric factors and diffraction for one extended source and a small lens aperture.

FIG. 6B illustrates the combined effects of geometric factors and diffraction for two sources and a small lens aperture.

FIG. 7 illustrates an example viewing geometry of a display, in accordance with some embodiments.

FIG. 8A depicts a first example viewing geometry of a display, in accordance with some embodiments.

FIG. 8B depicts a second example viewing geometry of a display, in accordance with some embodiments.

FIG. 9A schematically illustrates light paths traversed by imaging optics without a phase plate.

FIG. 9B schematically illustrates light paths traversed by imaging optics with a phase plate.

FIG. 10 is a schematic cross-sectional view of a display apparatus and an example beam emitted therefrom, in accordance with some embodiments.

EXAMPLE NETWORKS FOR IMPLEMENTATION OF THE EMBODIMENTS

Figure 1A:
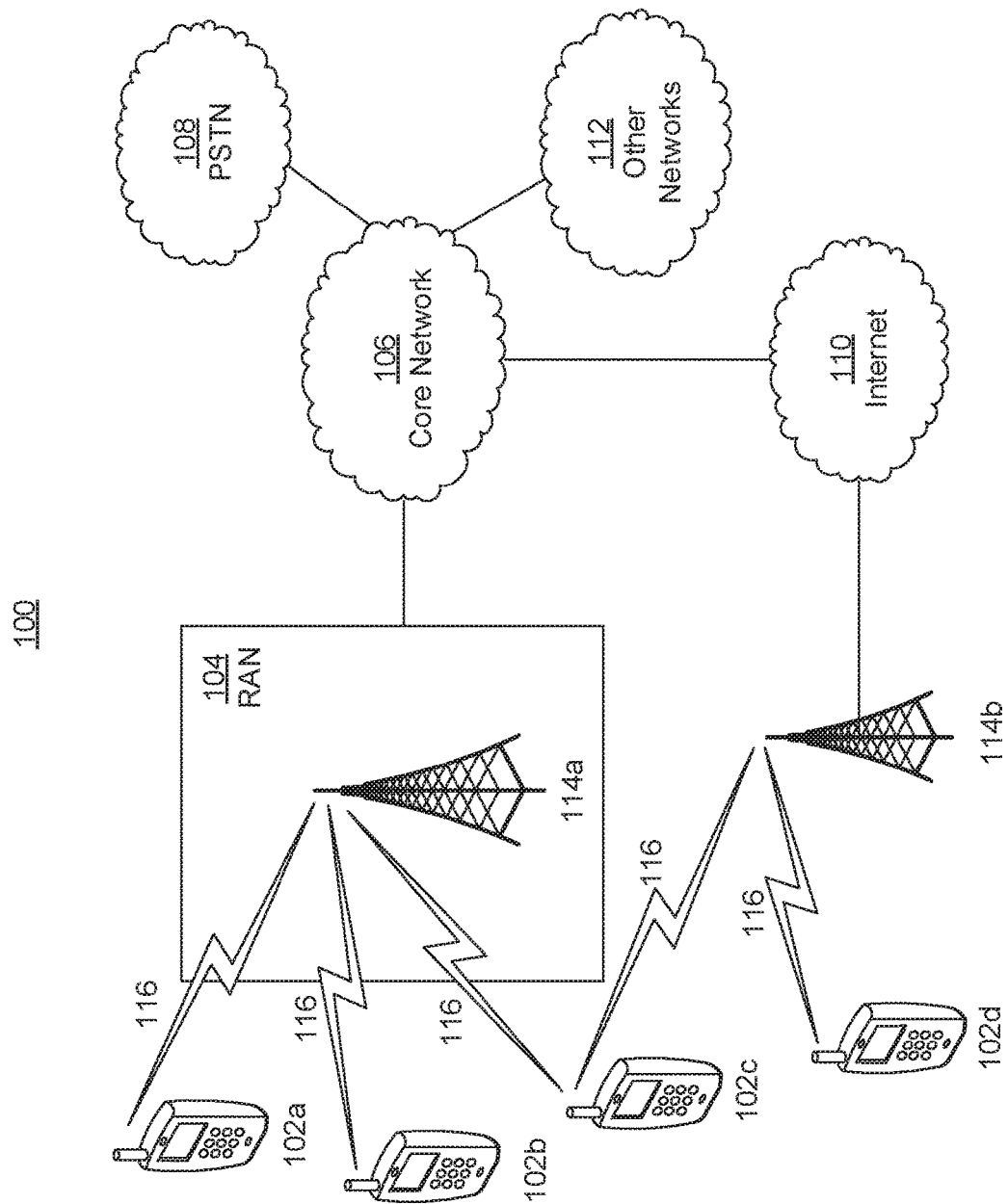
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
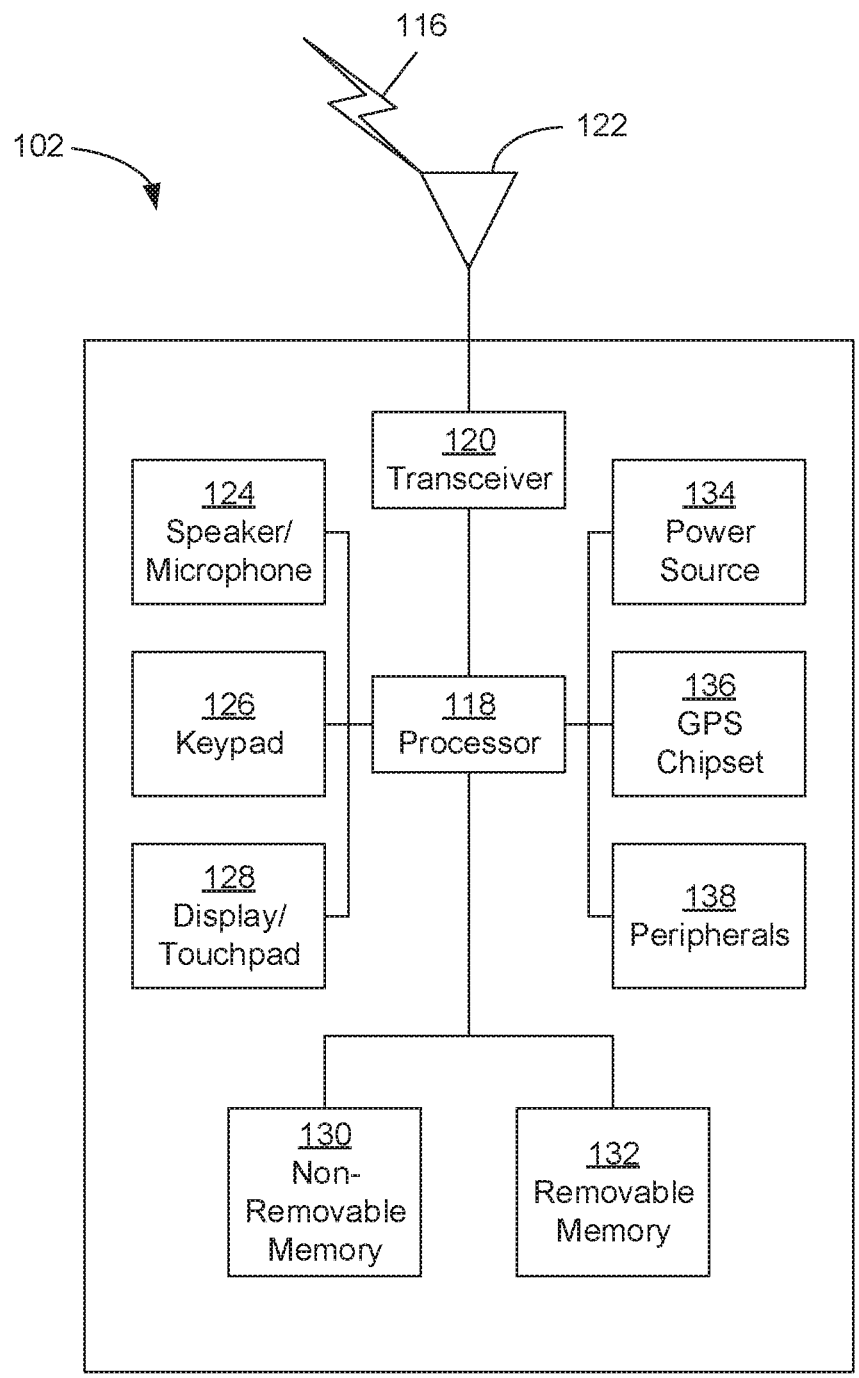
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

One or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Figure 2:
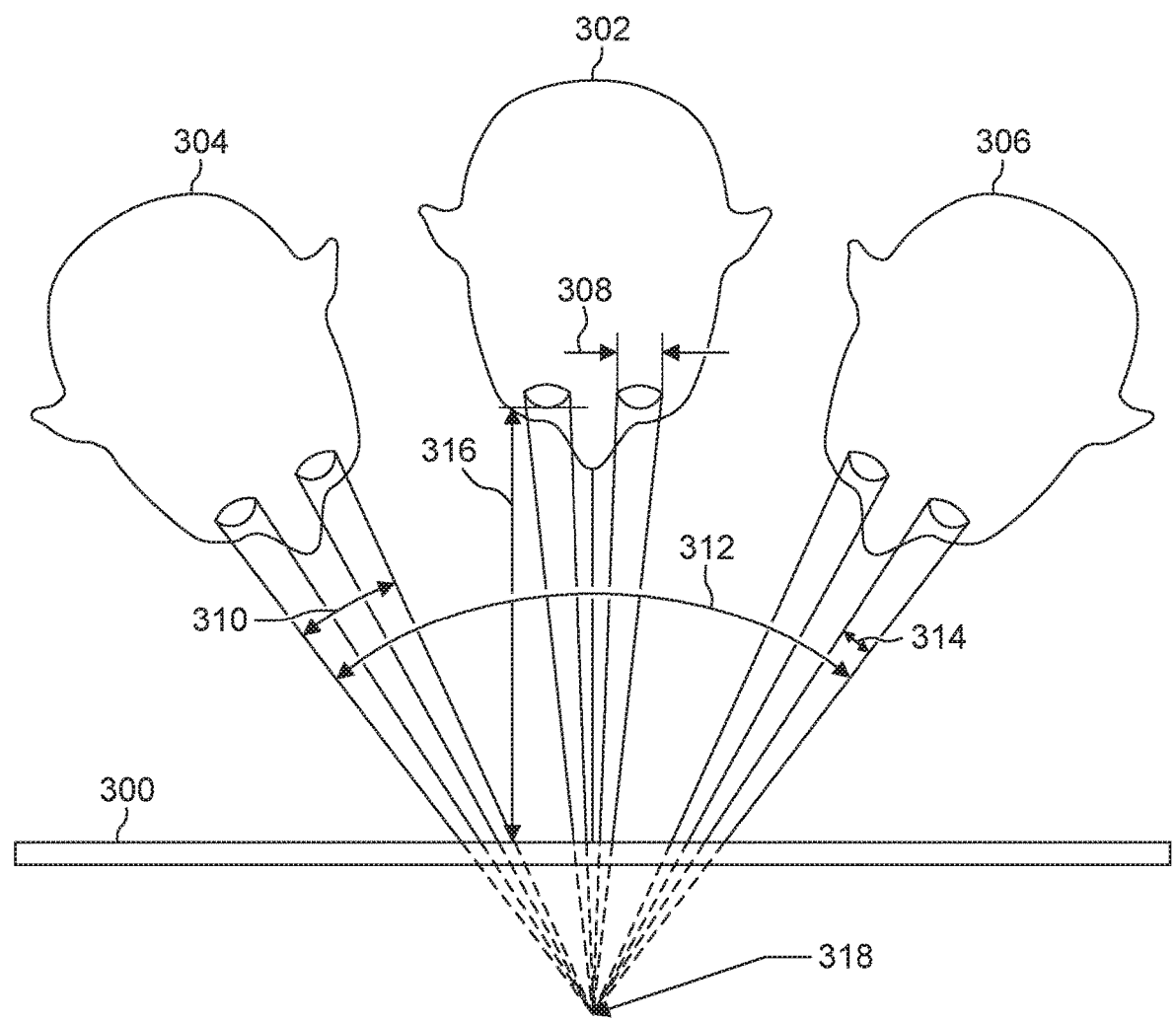
FIG. 2 depicts light emission angles of light from a display.

The present disclosure relates to display devices, particularly for the display of three-dimensional (3D) images. FIG. 2 is a schematic plan view illustrating example light emission angles directed towards different viewers of a display device. The display in FIG. 2 produces the desired retinal focus cues and multiple views of 3D content in a single flat form-factor panel. A single 3D display surface 300 projects at least two different views to the two eyes of each user in order to create a coarse 3D perception effect. The brain uses these two different eye images to determine 3D distance. Logically this is based on triangulation and interpupillary distance. To provide this effect, at least two views are projected from a light source 318 into a single-user viewing angle (SVA) 310, as shown in FIG. 2. Furthermore, in at least one embodiment, the display projects at least two different views inside a single eye pupil in order to provide the correct retinal focus cues. For optical design purposes, an "eye-box" 308 may be defined around the viewer eye pupil if determining the volume of space within which a viewable image is formed. In some embodiments of the display, at least two partially overlapping views are projected inside an Eye-Box Angle (EBA) 314 covered by the eye-box at a certain viewing distance 316. In some embodiments, the display is viewed by multiple viewers 302, 304, 306 looking at the display from different viewing angles. In such embodiments, several different views of the same 3D content are projected to respective viewers covering a whole intended multi-user viewing angle (MVA) 312.

FIG. 2 illustrates that it may be desirable for a display to cover three different angular ranges simultaneously: one range for covering the pupil of a single eye, one range for covering the two eyes of a single user, and one range for the multiuser case. Of these three angular ranges, the latter two may be resolved, for example, by using several light emitting pixels under a lenticular or parallax barrier structure or by using several projectors with a common screen. Such techniques may be suitable for the creation of relatively large light emission angles utilized in the creation of multiple views. However, it may be preferable to address the range covering the eye pupil in order to produce the correct retinal focus cues and overcome VAC.

It would be desirable for a flat form-factor high-quality 3D display to be able to produce both the eye convergence (CA) and retinal focus (FA) angles simultaneously.

Figure 3B:
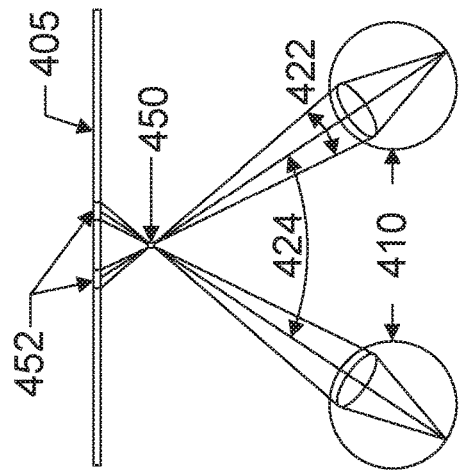
FIG. 3B depicts a pair of eyes and the focus angle and convergence angle produced by a display for a voxel formed behind the display surface.
Figure 3D:
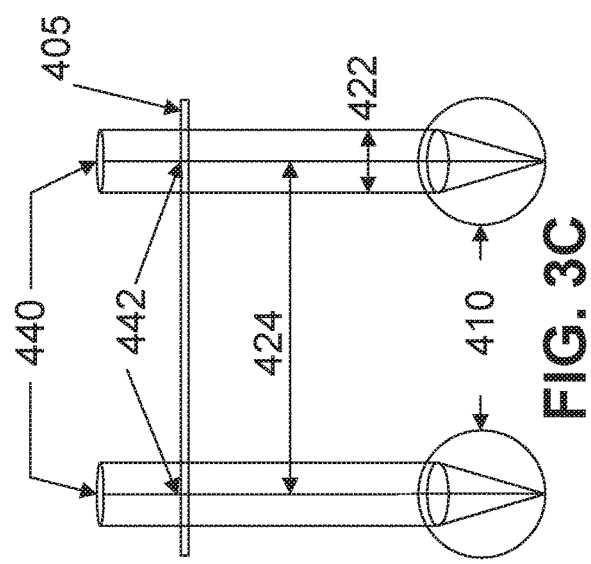
FIG. 3D depicts a pair of eyes and the focus angle and convergence angle produced by display for a voxel formed in front of the display surface.
Figure 3A:
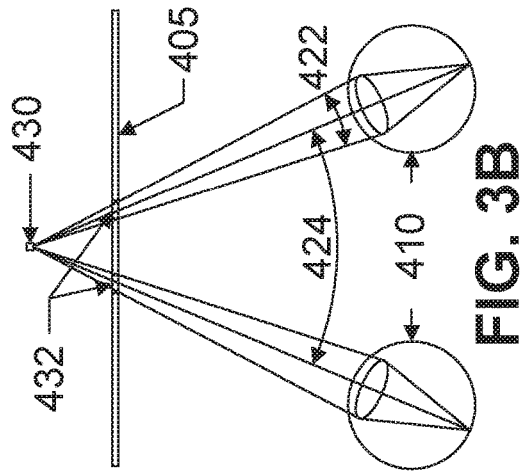
FIG. 3A depicts a pair of eyes and the focus angle and convergence angle produced by a display for a voxel formed at the display surface.

FIG. 3A depicts a schematic plan view illustrating a pair of eyes and the focus angle (FA) and convergence angle (CA) produced by a display for a voxel formed at a display surface according to some embodiments. It may be desirable for a flat form-factor high-quality 3D display to be able to produce both the eye convergence angles (CA) 424 and retinal focus angles (FA) 422 simultaneously. FIGS. 3A-D show these angles in four different 3D image content cases. In the first case illustrated in FIG. 3A, the image point 420 lies on the surface of the display 405 and only one illuminated display pixel visible to both eyes 410 is needed. Both eyes 410 are focused and converged to the same point 420.

FIG. 3B depicts a schematic plan view illustrating a pair of eyes and the FA and CA produced by a display for a voxel formed behind a display surface according to some embodiments. In the second case as illustrated in FIG. 3B, the virtual image point (voxel) 430 is behind the display 405, and two clusters of pixels 432 are illuminated. In addition, the direction of the light rays from these two display pixel clusters 432 are controlled in such a way that the emitted light is visible only to the correct eye, thus enabling the eyes 410 to converge to the same single virtual point 430.

Figure 3C:
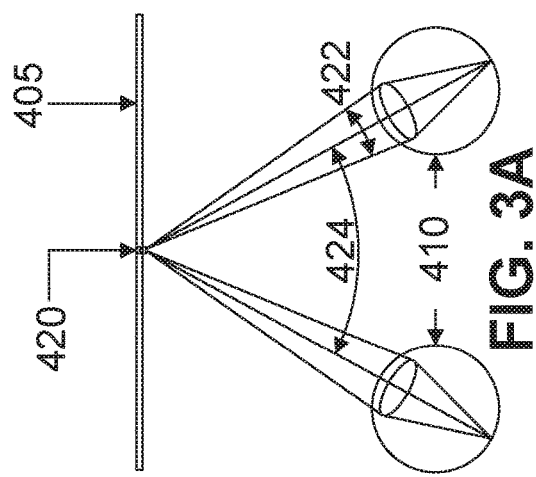
FIG. 3C depicts a pair of eyes and the focus angle and convergence angle produced by a display for a voxel formed at an infinite distance behind the display surface.

FIG. 3C depicts a schematic plan view illustrating a pair of eyes and the FA and CA produced by a display for a voxel formed at an infinite distance behind the display surface according to some embodiments. In the third case as illustrated in FIG. 3C, the virtual image 440 is at infinity behind the screen 405 and only parallel light rays are emitted from the display surface from two pixel clusters 442.

FIG. 3D depicts a schematic plan view illustrating a pair of eyes and the FA and CA produced by a display for a voxel formed in front of a display surface according to some embodiments. In the last case as illustrated in FIG. 3D, the image point or voxel 450 is in front of the display 405, two pixels clusters 452 are be activated, and the emitted beams crossed at the same point 450 where they focus. In the last three presented generalized cases (FIGS. 3B, 3C, and 3D), both spatial and angular control of emitted light is used by the display device in order to create both the convergence and focus angles for natural eye responses to the 3D image content.

A flat-panel-type multi-view display may be based on spatial multiplexing alone. A row or matrix of light emitting pixels (which may be referred to as sub-pixels) may be located behind a lenticular lens sheet or microlens array, and each pixel may be projected to a unique view direction or to a limited set of view directions in front of the display structure. The more pixels there are on the light emitting layer behind each light beam collimating feature, the more views can be generated. This leads to a direct trade-off situation between number of unique views generated and spatial resolution. If a smaller pixel size is desired from the 3D display, the size of individual sub-pixels may be reduced; or alternatively, a smaller number of viewing directions may be generated. Sub-pixel sizes may be limited to relatively large areas due to lack of suitable components. It would be desirable for a high-quality display to have both high spatial and angular resolutions. High angular resolution is desirable in fulfilling the SMV condition.

In order to produce 3D images at different focal planes with sufficient resolution using crossing beams, each beam is preferably well collimated with a narrow diameter. In some embodiments, the level of collimation is related to the position of the focal plane being displayed. For example, beams may be substantially collimated but slightly diverging for display of focal planes behind the display, and beams may be substantially collimated but slightly converging for display of focal planes in front of the display.

Furthermore, it may be preferable for the beam waist to be positioned at the same spot where the beams are crossing in order to avoid contradicting focus cues for the eye. If the beam diameter is large, the voxel formed in the beam crossing is imaged to the eye retina as a large spot. A large divergence value means that (for an intermediate image between the display and viewer) the beam becomes wider as the distance between the voxel and the eye gets smaller. With smaller distances, the eye resolves images in higher detail. However, the spatial resolution of the virtual focal plane becomes worse with smaller distances. Voxels positioned behind the display surface are formed with virtual extensions of the emitted beams, and wider beams may be acceptable because the eye's resolution also becomes worse at longer distances. In order to have high resolution both in front of and behind the display surface, it may be preferable for separate beams to have adjustable focuses. Without adjustable focus, the beams have a single fixed focus that sets the smallest achievable voxel size. However, because the eye resolution is lower at larger distances, the beam virtual extensions may be allowed to widen behind the display and the beam focus can be set to the closest specified viewing distance of the 3D image. In some embodiments, the focal surface resolutions can also be balanced throughout the volume where the image is formed by combining several neighboring beams in an attempt to make the voxel sizes uniform.

Figure 4B:
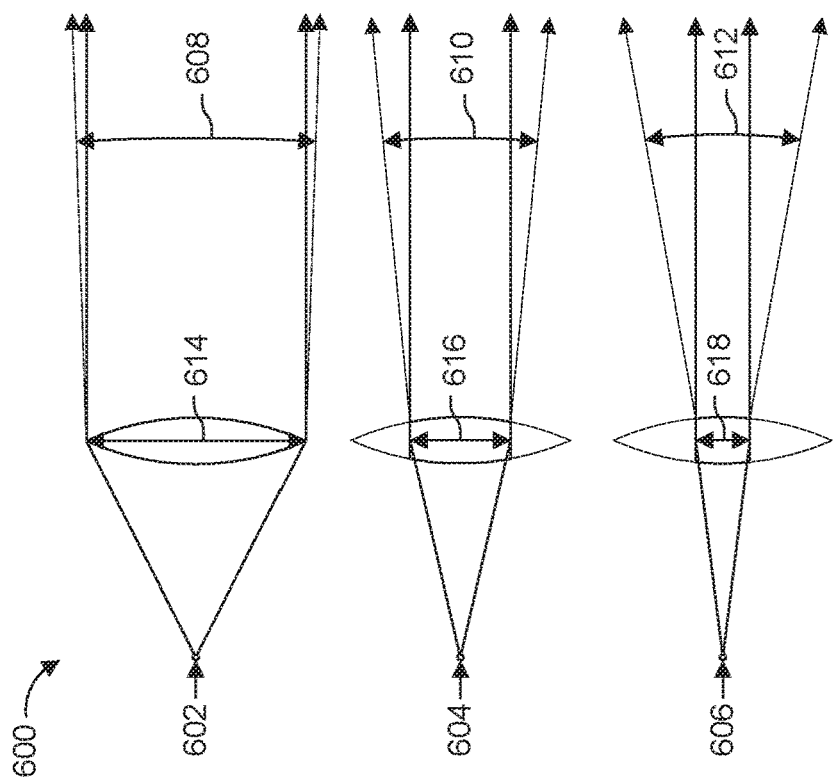
FIG. 4B illustrates beam divergence caused by diffraction.
Figure 4A:
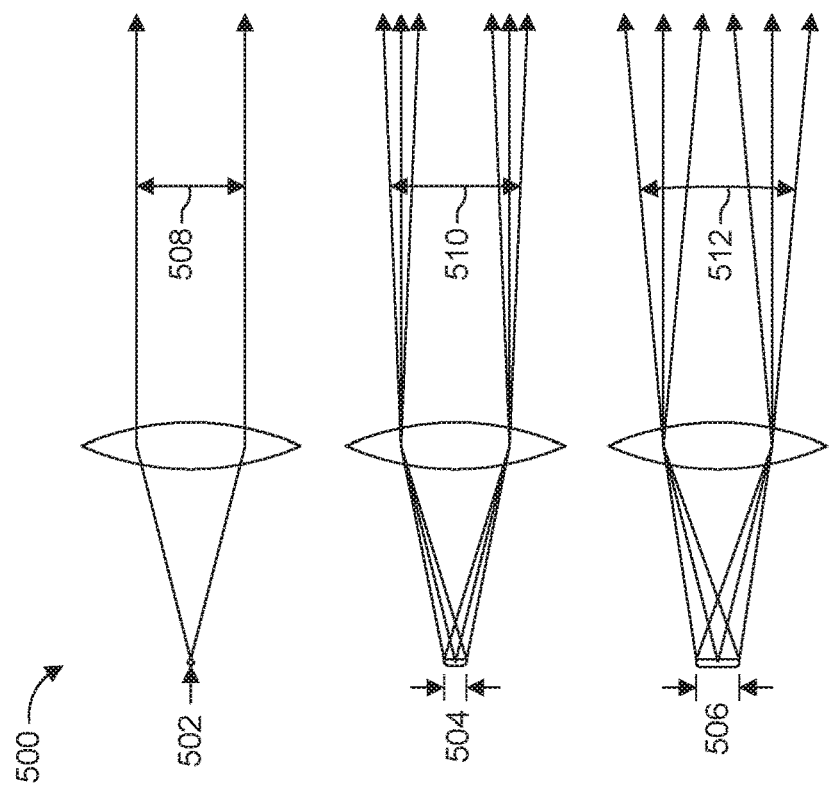
FIG. 4A illustrates beam divergence caused by geometric factors of a lens.

FIG. 4A depicts schematic views illustrating an example of increasing beam divergence caused by geometric factors. In the case of an ideal lens, the achievable light beam collimation is dependent on two geometrical factors: size of the light source and focal length of the lens. Perfect collimation without any beam divergence may only be achieved in the theoretical case in which a single color point source (PS) 502 is located exactly at focal length distance from an ideal positive lens. This case is pictured at the top of FIG. 4A. Unfortunately, all real-life light sources have some surface area from which the light is emitted making them extended sources (ES) 504, 506. As each point of the source is separately imaged by the lens, the total beam ends up consisting from a group of collimated sub-beams that propagate to somewhat different directions after the lens. And as presented in FIG. 4A with a series of lens configurations 500, as the source 502, 504, 506 grows larger, the total beam divergence 508, 510, 512 increases. This geometrical factor may not be avoided with any optical means, and it is the dominating feature causing beam divergence with relatively large light sources.

Another, non-geometrical, feature causing beam divergence is diffraction. The term refers to various phenomena that occur when a wave (of light) encounters an obstacle or a slit. It can be described as the bending of light around the corners of an aperture into the region of geometrical shadow. Diffraction effects can be found from all imaging systems, and they cannot be removed even with a perfect lens design that is able to balance out all optical aberrations. In fact, a lens that is able to reach the highest optical quality is often called "diffraction limited" as most of the blurring remaining in the image comes from diffraction. The angular resolution achievable with a diffraction limited lens can be calculated from the formula $\sin\theta = 1.22 * \lambda / D$, where $\lambda$ is the wavelength of light and D the diameter of the entrance pupil of the lens. It can be seen from the equation that the color of light and lens aperture size have an influence on the amount of diffraction. FIG. 4B shows a schematic presentation of how the beam divergence is increased when the lens aperture size is reduced. This effect can be formulated into a general principle in imaging optics design: if the design is diffraction limited, the way to improve resolution is to make the aperture larger. Diffraction is the dominating feature causing beam divergence with relatively small light sources.

FIG. 4B depicts schematic views illustrating an example of increasing beam divergence caused by diffraction according to some embodiments. FIG. 4B shows a schematic presentation 600 of point sources 602, 604, 606 of how the beam divergence 608, 610, 612 increases if the lens aperture size 614, 616, 618 is reduced. This effect may be formulated into a general principle in imaging optics design: if the design is diffraction limited, the way to improve resolution is to make the aperture larger. Diffraction is the dominating feature causing beam divergence with relatively small light sources.

Figure 5:
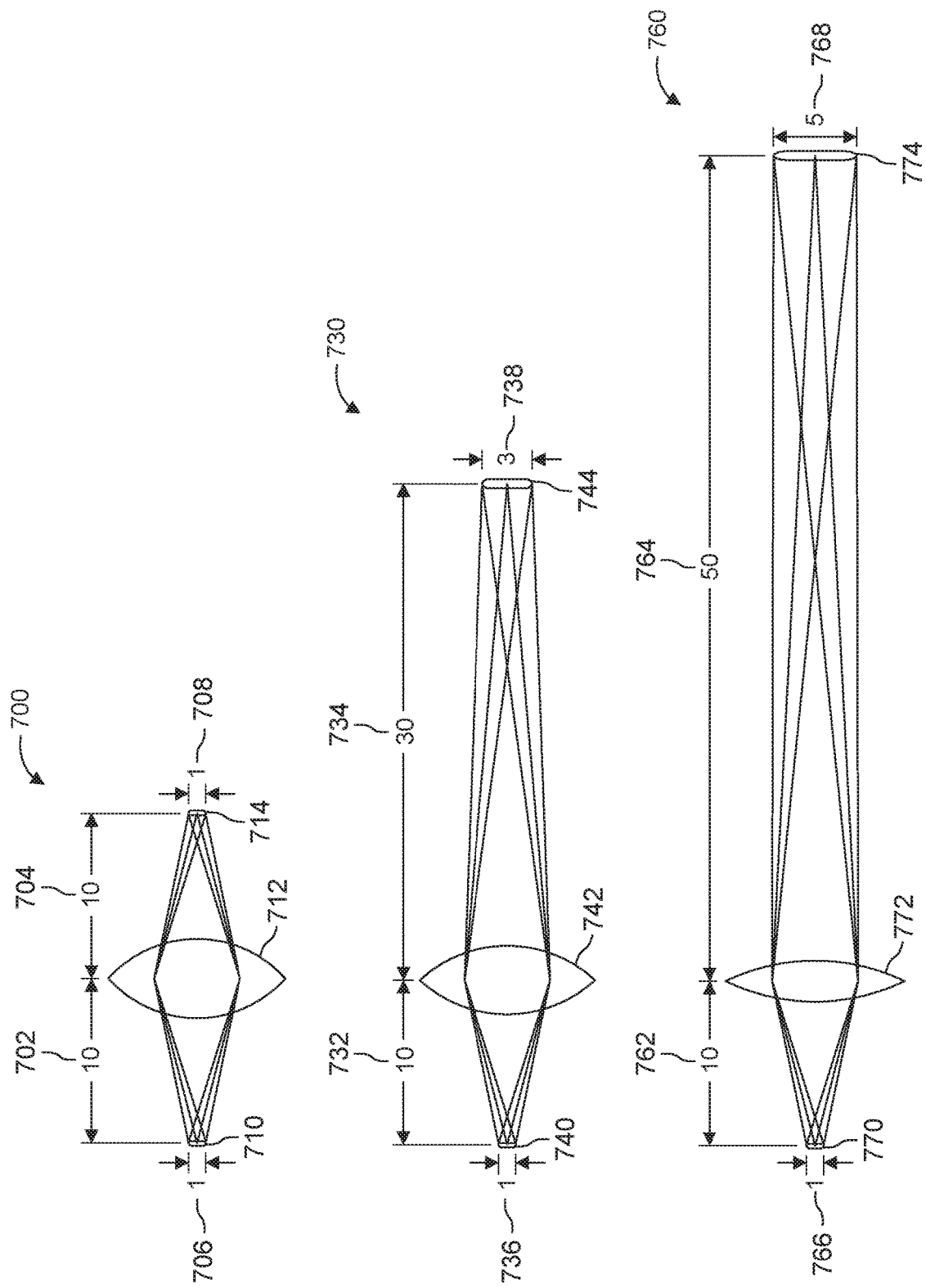
FIG. 5 illustrates the image magnification for three lenses of different optical powers.

As presented in FIG. 4A, the size of an extended source has a big effect on the achievable beam divergence. The source geometry or spatial distribution is mapped to the angular distribution of the beam and this can be seen in the resulting "far field pattern" of the source-lens system. In practice this means that if the collimating lens is positioned at the focal distance from the source, the source is imaged to a relatively large distance from the lens and the size of the image can be determined from the system "magnification ratio". In the case of a simple imaging lens, this ratio can be calculated by dividing the distance between lens and image with the distance between source and lens as illustrated in FIG. 5. If the distance between source and lens is fixed, different image distances can be achieved by changing the optical power of the lens with the lens curvature. But when the image distance becomes larger and larger in comparison to the lens focal length, the required changes in lens optical power become smaller and smaller, approaching the situation where the lens is effectively collimating the emitted light into a beam that has the spatial distribution of the source mapped into the angular distribution and source image is formed without focusing.

FIG. 5 illustrates three example lenses having various magnification ratios. In the case of a simple imaging lens, the magnification ratio may be calculated by dividing the distance 704, 734, 764 between lens 712, 742, 772 and image 714, 744, 774 with the distance 702, 732, 762 between source 710, 740, 770 and lens 712, 742, 772 as illustrated in FIG. 5. If the distance 702, 732, 762 between source 710, 740, 770 and lens 712, 742, 772 is fixed, different image distances 704, 734, 764 may be achieved by changing the optical power of the lens 704, 734, 764 with the lens curvature. But if the image distance 704, 734, 764 becomes larger and larger in comparison to the lens focal length 702, 732, 762, the required changes in lens optical power become smaller and smaller, approaching the situation where the lens is effectively collimating the emitted light into a beam that has the spatial distribution of the source mapped into the angular distribution and source image is formed without focusing. In the set of lens configurations 700, 730, 760, as the source 706, 736, 766 grows larger, the projected image height 708, 738, 768 increases.

In flat form factor goggleless displays, it may be helpful for the pixel projection lenses to have very small focal lengths in order to achieve the flat structure and in order to allow the beams from a single projection cell to be projected to a relatively large viewing distance. This means that the sources may be effectively imaged with high magnification when the beams of light propagate to the viewer. For example, if the source size is 50 µm×50 µm, projection lens focal length is 1 mm and viewing distance is 1 m, the resulting magnification ratio is 1000:1 and the source geometric image will be 50 mm×50 mm in size. This means that the single light emitter can be seen only with one eye inside this 50 mm diameter eye-box. If the source has a diameter of 100 µm, the resulting image would be 100 mm wide and the same pixel could be visible to both eyes simultaneously as the average distance between eye pupils is only 64 mm. In the latter case, the stereoscopic 3D image would not be formed as both eyes would see the same images. The example calculation shows how the geometrical parameters like light source size, lens focal length and viewing distance are tied to each other.

As the beams of light are projected from the LF display pixels, divergence causes the beams to expand. This applies not only to the actual beam emitted from the display towards the viewer but also to the virtual beam that appears to be emitted behind the display, converging to the single virtual focal point close to the display surface. In the case of a multi-view display this may be helpful because the divergence expands the size of the eye-box. However, it may be useful to provide a beam size that does not exceed the distance between the two eyes, since that may break the stereoscopic effect. If it is desired to create a voxel to a virtual focal plane with two or more crossing beams anywhere outside the display surface, the spatial resolution achievable with the beams gets worse as the divergence increases. It may also be noted that if the beam size at the viewing distance is larger than the size of the eye pupil, the pupil becomes the limiting aperture of the whole optical system.

Figure 6C:
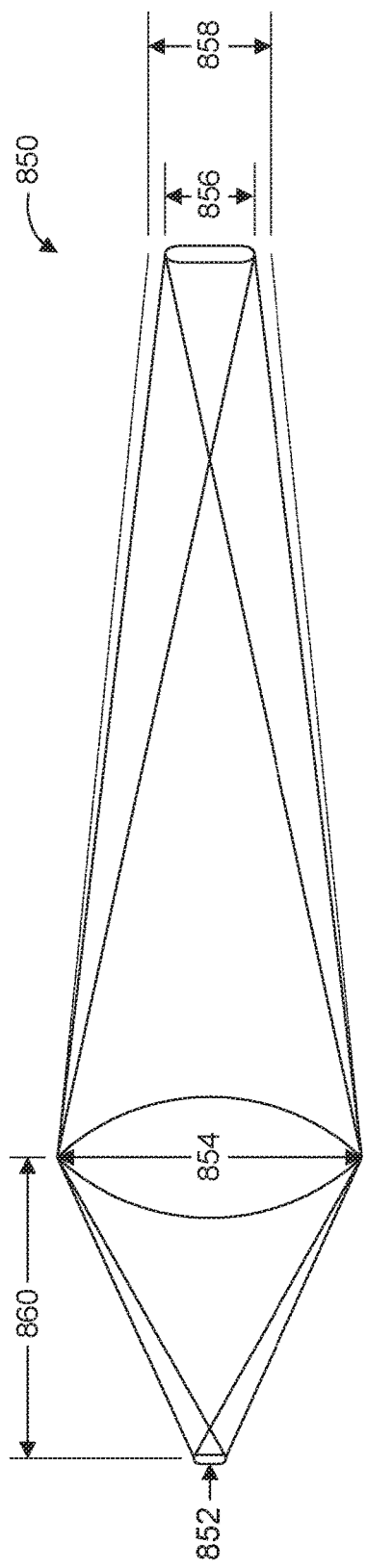
FIG. 6C illustrates the combined effects of geometric factors and diffraction for one source and a large lens aperture.

Geometric and diffraction effects are utilized in the LF display's design in order to achieve an optimal solution for voxel resolution. With very small light sources, optical system measurements become closer to the wavelength of light and diffraction effects become more significant. The schematic presentations of FIGS. 6A-D illustrate how the geometric and diffraction effects work together in cases 800, 820, 850, 870 such that one extended source 802, 852 or two extended sources 822, 824, 872, 874 are imaged to a fixed distance with a fixed magnification. FIG. 6A shows a case 800 where the lens aperture size 804 is relatively small, and the extended source 802 is located a focal distance 810 away from the lens. In FIG. 6A, the geometric image (GI) 806 is surrounded by blur that comes from diffraction making the diffracted image (DI) 808 much larger.

FIG. 6B shows a case 820 where two extended sources 822, 824 are placed side-by-side at a focal distance 836 from the lens and imaged with a lens that has the same small aperture size 826. Even though the GIs 828, 830 of both sources 822, 824 are clearly separated, the two source images cannot be resolved because the diffracted images 832, 834 overlap. In practice, this situation would mean that reduction of light source size would not improve the achievable voxel resolution as the resulting source image size would the same with two separate light sources as with one larger source that covers the area of both separate emitters. In order to resolve the two source images as separate pixels/voxels, the aperture size of the imaging lens should be increased.

FIG. 6C shows a case 850 where the lens has the same focal length 860 but a larger aperture 854 is used to image the extended source 852. Now the diffraction is reduced and the DI 858 is only slightly larger than the GI 856, which has remained the same as magnification is fixed.

Figure 6D:
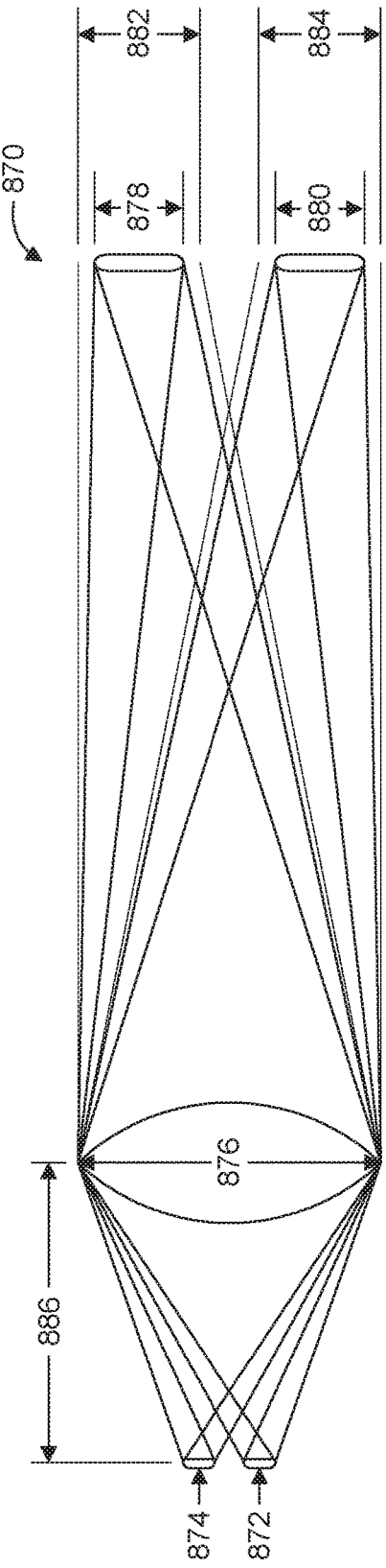
FIG. 6D illustrates the combined effects of geometric factors and diffraction for two sources and large lens aperture.

FIG. 6D shows a case 870 where two extended sources 872, 874 are located a focal distance 886 away from a lens with an aperture size 876 equal to the size of the lens. The DIs 882, 884 are only slightly larger than the GIs 878, 880. The two spots are now resolved because the DIs 882, 884 are no longer overlapping, enabling use of two different sources 872, 874 and improving the spatial resolution of the voxel grid.

Optical Design Features of Displays Based on Crossing Beams

Some embodiments provide the ability to create a display. In some embodiments, the display may be used as a light field display that is capable of presenting multiple focal planes of a 3D image while addressing the vergence-accommodation conflict (VAC) problem.

In some embodiments, the display projects emitter images towards both eyes of the viewer without light scattering media between the 3D display and the viewer. In order to create a stereoscopic image by creating a voxel located outside the display surface, it may be useful for a display to be configured so that an emitter inside the display associated with that voxel is not visible to both eyes simultaneously. Accordingly, it may be useful for the field-of-view (FOV) of an emitted beam bundle to cover both eyes. It may also be useful for the single beams to have FOVs that make them narrower than the distance between two eye pupils (~64 mm on average) at the viewing distance. The FOV of one display section as well as the FOVs of the single emitters may be affected by the widths of the emitter row/emitter and magnification of the imaging optics. It can be noted that a voxel created with a focusing beam may be visible to the eye only if the beam continues its propagation after the focal point and enters the eye pupil at the designated viewing distance. It may be especially useful for the FOV of a voxel to cover both eyes simultaneously. If a voxel were visible to single eye only, the stereoscopic effect may not be formed and 3D image may not be seen. Because a single display emitter can be visible to only one eye at a time, it may be useful to increase the voxel FOV by directing multiple crossing beams from more than one display emitter to the same voxel within the human persistence-of-vision (POV) time frame. In some embodiments, the total voxel FOV is the sum of individual emitter beam FOVs.

In order to make local beam bundle FOVs overlap at their associated specified viewing distances, some embodiments may include a curved display with a certain radius. In some embodiments, the projected beam directions may be turned towards a specific point, e.g., using a flat Fresnel lens sheet. If the FOVs were not configured to overlap, some parts of the 3D image may not be formed. Due to the practical size limits of a display device and practical limits for possible focal distances, an image zone may be formed in front of and/or behind the display device corresponding to the special region wherein the 3D image is visible.

FIG. 7 is a schematic plan view illustrating an exemplary viewing geometry available with a 3D display structure according to some embodiments. FIG. 7 shows a schematic presentation 900 of an example viewing geometry that may be achieved with a 3D display structure 902 based on the use of crossing beams. In front of the curved display 902, the limit of a 3D image zone 904 may be considered to be the furthest focal distance from the display with reasonable spatial resolution. The image zone 904 may also be considered to be limited by the FOV 906 of the whole display. In order to get the maximum resolution at the minimum image distance, the display optical features may be designed to focus the source images to the furthest edge of this zone. In some embodiments, there may also be another image zone behind the display formed by the virtual extensions of the emitted beams. In some embodiments, voxels behind the display 902 may have larger allowable sizes because the viewer is positioned further away and because eye resolution may be lower at greater distances. In some embodiments, a maximum image distance may be selected on the basis of a minimum acceptable resolution achievable with the expanding beam virtual extensions.

FIG. 7 illustrates an example viewing geometry of a display 902, in accordance with some embodiments. In particular, the display surface depicted in FIG. 7 is curved with a radius which is the same as the designated viewing distance. In the example, the overlapping beam bundle FOVs 910 form a viewing zone around the facial area of the viewer 912. The size of this viewing zone may affect the amount of movement allowed for the viewer head. It may be useful for both eye pupils (and the distance 914 between the pupils) to be positioned inside the zone simultaneously in order to make the stereoscopic image possible. The size of the viewing zone may be selected by altering the beam bundle FOVs 908. The particular design may be selected on the basis of the particular use case.

FIGS. 8A-8B are schematic plan views illustrating exemplary viewing geometry scenarios of 3D displays according to some embodiments. FIGS. 8A-8B show schematic representations of two different example viewing geometry cases 1000, 1100.

A first scenario 1000, as shown in FIG. 8A, depicts a scenario of a single viewer 1004 in front of a display and the corresponding viewing geometry in which a small viewing zone covers both eyes' pupils. This may be achieved using narrow beam bundle FOVs 1002. A minimum functional width of the zone may be affected by the eye pupil distance. For example, an average pupil distance may be around 64 mm. A small width may also imply a small tolerance for viewing distance changes as the narrow FOVs 1002 tend to quickly separate from each other at increasing distances both in front of and behind the optimal viewing location.

A second scenario 1100, as shown in FIG. 8B, depicts a viewing geometry with wider beam bundle FOVs 1102. This viewing geometry may make it possible to have multiple viewers 1104 inside the viewing zone and at different viewing distances. In this example, the positional tolerances may be large.

The viewing zone may be increased by increasing the FOV of each display beam bundle. This can be done, for example, by increasing the width of the light emitter row or by changing the focal length of the beam collimating optics. Smaller focal lengths may result in larger voxels, so it may be useful to increase the focal length to achieve better resolution. A trade-off may be found between the optical design parameters and the design needs. Accordingly, different use cases may balance between these factors differently.

Example Embodiments Using Micro-LED Sources

Some embodiments make use of μLEDs. These are LED chips that are manufactured with the same basic techniques and from the same materials as standard LED chips. However, the μLEDs are miniaturized components and they can be made as small as 1 μm-10 μm in size. One dense matrix that has been manufactured so far has 2 μm×2 μm chips assembled with 3 μm pitch. The μLEDs have been used as backlight components in televisions. When compared to OLEDs, the μLEDs are much more stable components and they can reach very high light intensities.

A bare μLED chip may emit a specific color with spectral width of ~20-30 nm. A white source can be created by coating the chip with a layer of phosphor, which converts the light emitted by blue or UV LEDs into a wider white light emission spectrum. A full-color source can also be created by placing separate red, green and blue LED chips side-by-side as the combination of these three primary colors creates the sensation of a full color pixel when the separate color emissions are combined by the human visual system. The previously mentioned very dense matrix would allow the manufacturing of self-emitting full-color pixels that have a total width below 10 μm (3×3 μm pitch).

Light extraction efficiency from the semiconductor chip is one of the parameters that determine electricity-to-light efficiency of LED structures. There are several methods that aim to enhance the extraction efficiency and thus allow LED-based light sources to use the available electric energy as efficiently as feasible, which is useful with mobile devices that have a limited power supply. Some methods use a shaped plastic optical element that is integrated directly on top of a LED chip. Due to lower refractive index difference, integration of the plastic shape extracts more light from the chip material in comparison to a case where the chip is surrounded by air. The plastic shape also directs the light in a way that enhances light extraction from the plastic piece and makes the emission pattern more directional. Other methods shape the chip itself to a form that favors light emission angles that are more perpendicular towards the front facet of the semiconductor chip and makes it easier for the light to escape the high refractive index material. These structures also direct the light emitted from the chip.

Phase Modulation Used in Extending Image Depth of Focus

In some embodiments, wave-front coding is used to extend focal depth. Wave-front coding utilizes a combination of a phase modulating mask and image processing in order to reach extended depth of focus images. Examples of wave-front coding techniques may be found in E. D. Dowski and W. T. Cathey, "Extended depth of field through wave-front coding," Applied Optics Vol. 34, Issue 11, pp. 1859-1866, (1995), and in U.S. Pat. Nos. 6,842,297 and 7,436,595. In some embodiments, phase modulating masks may be implemented as rigid injection molded polymer plates, or as shallow surface features directly integrated into lens structures or transparent aperture plates. Wave-front coding may be implemented in order to extend camera focal depth without the need for moving parts or large additional hardware costs. Image processing dedicated to wave-front coding may be useful for reducing or remove the effect of the phase modulating mask from images to be displayed.

In some embodiments, wave-front coding is used to modify the image field in such a way that it becomes somewhat focus invariant. In some embodiments, a wave-front modulating element is added near the imaging system principal plane (aperture stop), in order to produce a range of depths where the image may not be in exact sharp focus, but rather the depth range where the light energy distribution is almost identical becomes extended. This optical functionality is illustrated schematically in FIGS. 9A-9B.

FIG. 9A illustrates an effect of focusing without a phase plate. Light from a source 1902 is focused by a lens 1904 to a sharp image in a focal plane 1906. At planes, 1908 and 1910, however, which are slightly offset from the focal plane, the image of the source 1902 is much more blurred. FIG. 9B illustrates the same arrangement as in FIG. 9A except that the arrangement of FIG. 9B includes a phase plate 1912. Because the arrangement of FIG. 9B includes phase plate 1912 in front of the lens 1904, the light source 1902 is focused to a fairly sharp image in all three image planes (though the images may appear to have "a veil of light" or a "halo" around them). With the use of phase plate 1912, different objects may be discerned from a single image taken at either of the image planes or even between them, without the need for distance adjustments. The system of FIG. 9A may be described as having an extended depth of focus.

A wave-front coding method may produce a "halo" of light that surrounds the brighter "focus" spots. The blurred area around each image spot may cause deterioration of contrast to the raw image. In some embodiments, the halo effects can be mitigated with electronic processing that incorporates the optics point spread function (PSF). Because the PSF remains substantially constant over a certain extended depth range with an extended depth of field camera module lens, the same "decoding" operation can be used for all image depths. If the phase modulating component is active, e.g. a phase SLM, it is also possible to obtain several images with different phase masks at different points in time and temporally multiplex the different depth images using techniques described in WO2015083162. This method may further increase the camera system's range of focus. In some embodiments, wave-front coding may be utilized for relaxing tolerances of the optical elements. For example, small variations in surface shapes or element thicknesses can be compensated with the extended focal range of the module. In some embodiments, color dispersion (lateral color) may be compensated using wave-front coding techniques, as the different focal depths of colors can be fixed with the decoding algorithms.

Example Optical Structure and Function

Systems and methods are described for providing a 3D display, such as a light-field display. In some embodiments, a display device includes a light-emitting layer that includes a plurality of separately-controllable pixels. In some embodiments, an optical method and construction of an optical system is used for creating high-resolution 3D LF images with crossing beams. Light is emitted from a layer with separately controllable small emitters (e.g. μLEDs). A lens structure (e.g. polycarbonate microlens sheet) overlays the emitters. The lens structure focuses the light into a set of beams that are used to form voxels at multiple viewing directions. In some embodiments, the emitters and lenses form a series of projection cells that are separated from each other. In some embodiments, the projection cells are separated by opaque baffle structures that suppress crosstalk between neighboring cells. A phase modifying layer extends the beam waist from a single focus spot, determined by the lens focal length, to a range of depth values along the beam propagation path where the focused spot size remains nearly constant. The source matrix may be used to generate different spatial emission patterns that work in unison with the phase modifying element. As the element modifies beam energy distribution inside the beam waist, the emission pattern made with the source matrix is used for active balancing of the energy peaks.

In some embodiments, the optical system may use crossing beams to form voxels. In some embodiments, voxels can be formed at various distances from the surface of the display. Voxels may be formed, for example, in front of, behind, and/or on the display surface. Single beams with extended focus depths can be used for creating the correct eye retinal focus cues. Multiple beams crossing at the voxel positions may be used for covering the larger field of view of the viewer eye pair. This configuration may help the visual system correct for eye convergence.

Some embodiments provide the ability to create a display, such as a light field (LF) display, that is capable of presenting multiple focal planes of a 3D image. Some embodiments may be operative to reduce or overcome the vergence-accommodation conflict (VAC) problem. Some embodiments provide the ability to create a display, such as a light field display, with thin optics without the need for moving parts.

In some embodiments, a system and method are presented to expand the depth of focus for light projection using phase modulating optical elements in conjunction with spatio-temporal display control. In some embodiments, a wave-front coding method allows for looser tolerances for the optical components of an LF display by extending each beam's focus range. In some embodiments, a wave-front coding method allows for compensation of color dispersion in an LF display.

Some embodiments provide an optical method and construction of an optical system that can be used for creating high-resolution 3D images with crossing beams. FIG. 10 depicts a 3D display structure 1050 and its functionality, in accordance with some embodiments. As shown in the example in FIG. 10, light is emitted from a layer 1052, which may be an addressable two-dimensional array of light-emitting elements 1054, which may be separately controllable small emitters, such as μLEDs. A lens structure 1056 (e.g. polycarbonate microlens sheet) overlaying the emitters collects and focuses the light into a set of beams that are used to form an image at different viewing directions. The emitters and lenses form a series of projection cells 1060 that are separated from each other with opaque baffle structures 1058 that suppress crosstalk between neighboring cells.

A phase modifying layer 1062 placed proximate to the projection cell optics' principal plane (aperture stop) extends the beam waist from a single focus spot, determined by the lens focal length, to a range of depth values 1064 along the beam propagation path where the focused spot size remains substantially constant, resulting in an extended beam waist. The phase modifying layer can be manufactured by, e.g., nanoimprinting from UV-curable optical material on a flexible substrate or by injection molding with an optical polymer. In some embodiments, the phase modifying layer is integrated into the collimator lens structure. For example, the layer may be integrated in the manufacturing process of the collimator lens structure, or it may be integrated by laminating the two sheets or foils together. In the latter case, the two main optical feature positions are fixed in the component manufacturing phase, which may be beneficial in the assembly of the display. In some embodiments, the phase modifying optical features are the same for all projection cells. In some embodiments, the phase modifying optical features of projection cells may be configured differently in order to tune the beam properties over the display surface. This may be useful in the case of a flat large screen, where the beam directions may be turned to the viewer direction, e.g., at greater angles for projection cells closer to the edges of the display. Phase plate shapes may include, e.g., cubic, quartic, exponential, logarithmic, sinusoidal or freeform. In some embodiments, the phase modifying layer can be active, e.g. by using a liquid crystal SLM in which the phase modification for each beam can be optimized according to e.g. user tracking.

Figure 11B:
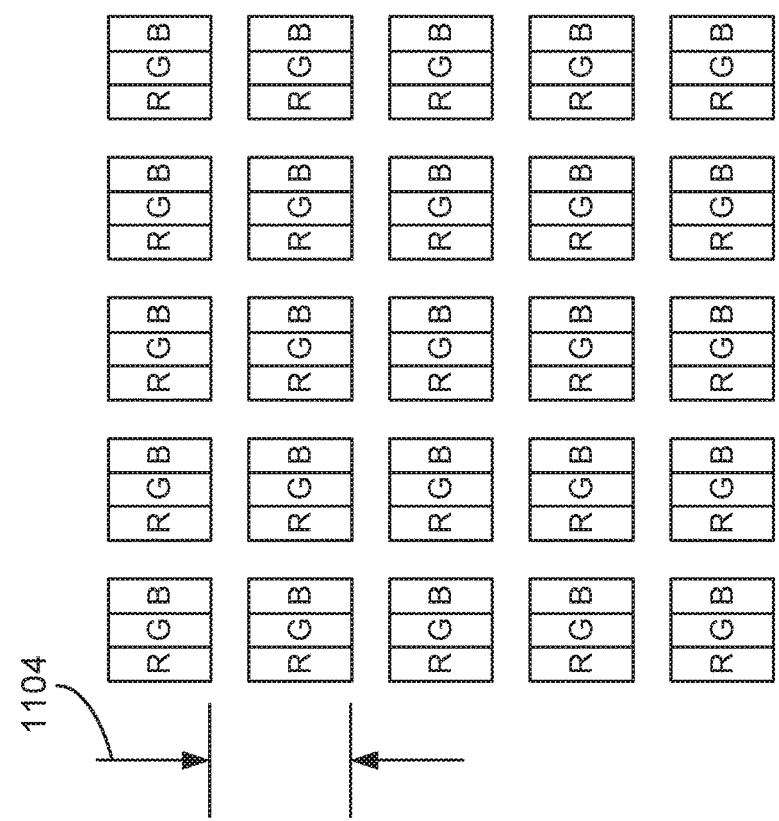
FIG. 11B depicts an example source matrix comprising light emitting components of three different colors, in accordance with some embodiments.
Figure 11A:
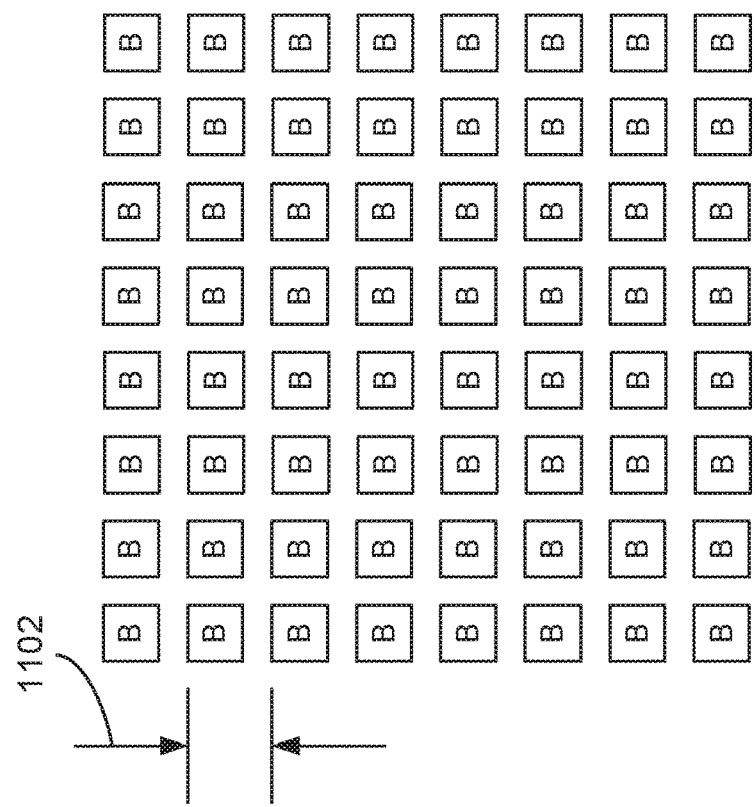
FIG. 11A depicts an example source matrix comprising light emitting components of a single color, in accordance with some embodiments.

In some embodiments, the light emitting layer includes a matrix of pixels that can be separately activated. Light emitting elements may include, for example, μLEDs, OLEDs, or small pixel LCD panels. FIGS. 11A-B depict example source matrix structures, in accordance with some embodiments. FIG. 11A depicts a matrix comprising single color emitters, e.g., blue μLEDs with white phosphor coating, arranged with a pitch 1102. FIG. 11B depicts an example source matrix comprising light emitting components of three different colors (red, green and blue) assembled into a matrix with clearly defined full-color pixel size and pitch 1104. In some embodiments where full-color pixels are used, the phase modifying element may mix the spatially separated colors in the beam waist and generate full-color beams. In some embodiments where single color emitters are used and they generate white light, a separate active color mask (e.g., an LCD panel) may be positioned in front of the projection lenses. This configuration may call for the color pixel sizes to be considerably smaller than the projection cell aperture size if the phase modifying element operates across the entire cell aperture.

In some embodiments, the source matrix may be used to generate different spatial emission patterns that work in unison with the phase modifying element. As the phase modifying element modifies beam energy distribution inside the beam waist, the emission pattern made with the source matrix can be used for balancing the energy peaks. In some embodiments, the patterns are fixed for each beam. In some embodiments, the patterns can be actively modified on the basis of voxel distance or viewer position.

Figure 12C:
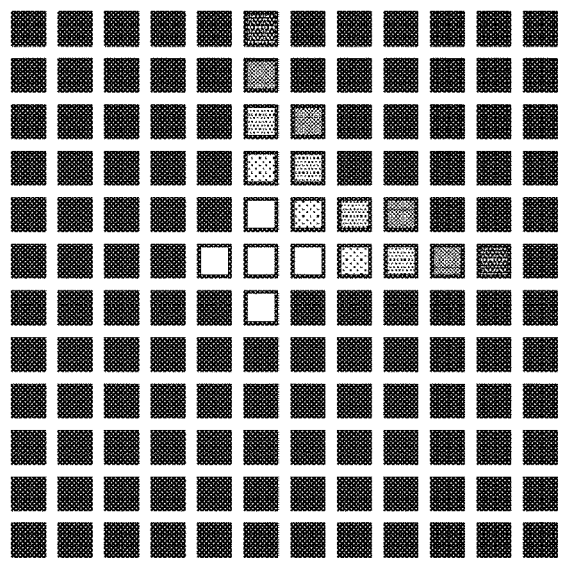
FIGS. 12A-12C schematically illustrate example spatial emission patterns generated with the source matrix in accordance with some embodiments.
Figure 12B:
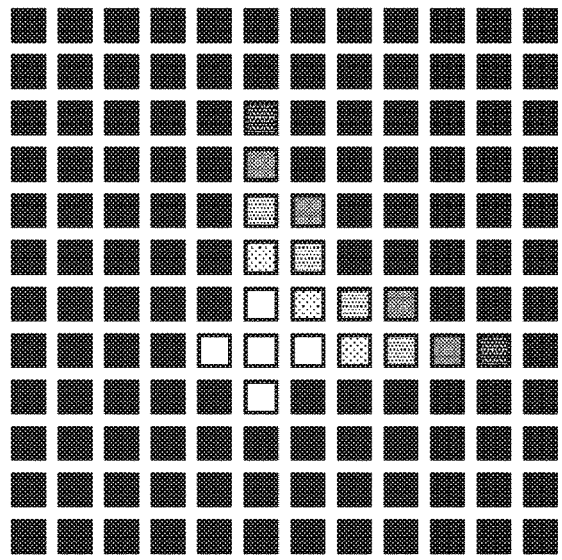
Figure 12A:
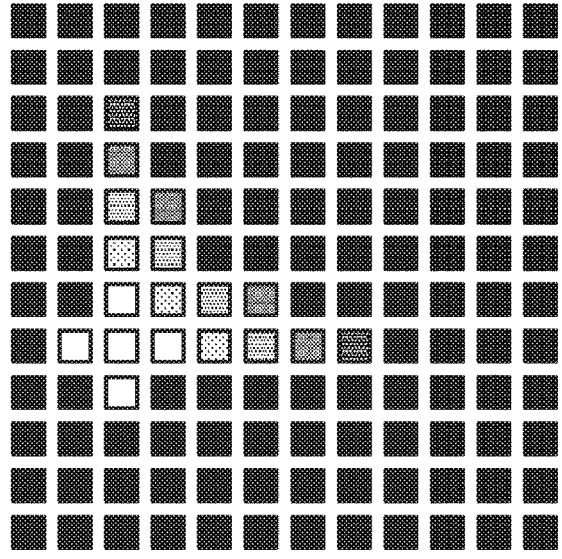

FIGS. 12A-12O depict example spatial emission patterns that may be generated with the source matrix, in accordance with some embodiments. Beam directions may be adjusted, for example, by shifting the patterns both in horizontal and vertical directions. For example, as compared to the spatial emission pattern of FIG. 12B, the pattern of FIG. 12A is shifted in a vertical direction and the pattern of FIG. 12C is shifted in a horizontal direction. In embodiments that use μLEDs, the high dynamic range of such sources may help in improving the image contrast that may be lowered by the phase modifying element. Active adjustment of individual component emission patterns may be employed in some embodiments for creating good quality images. In some embodiments, different patterns may be used for different beams used for different focal planes. In some embodiments, the μLEDs can be used for temporal multiplexing of focal planes by actively dimming or brightening the output when the voxels at the different focal planes are rendered. This function may be used for limited beam position scanning and improved voxel resolution by moving the most energetic spot on the beam together with the pattern.

Figure 13:
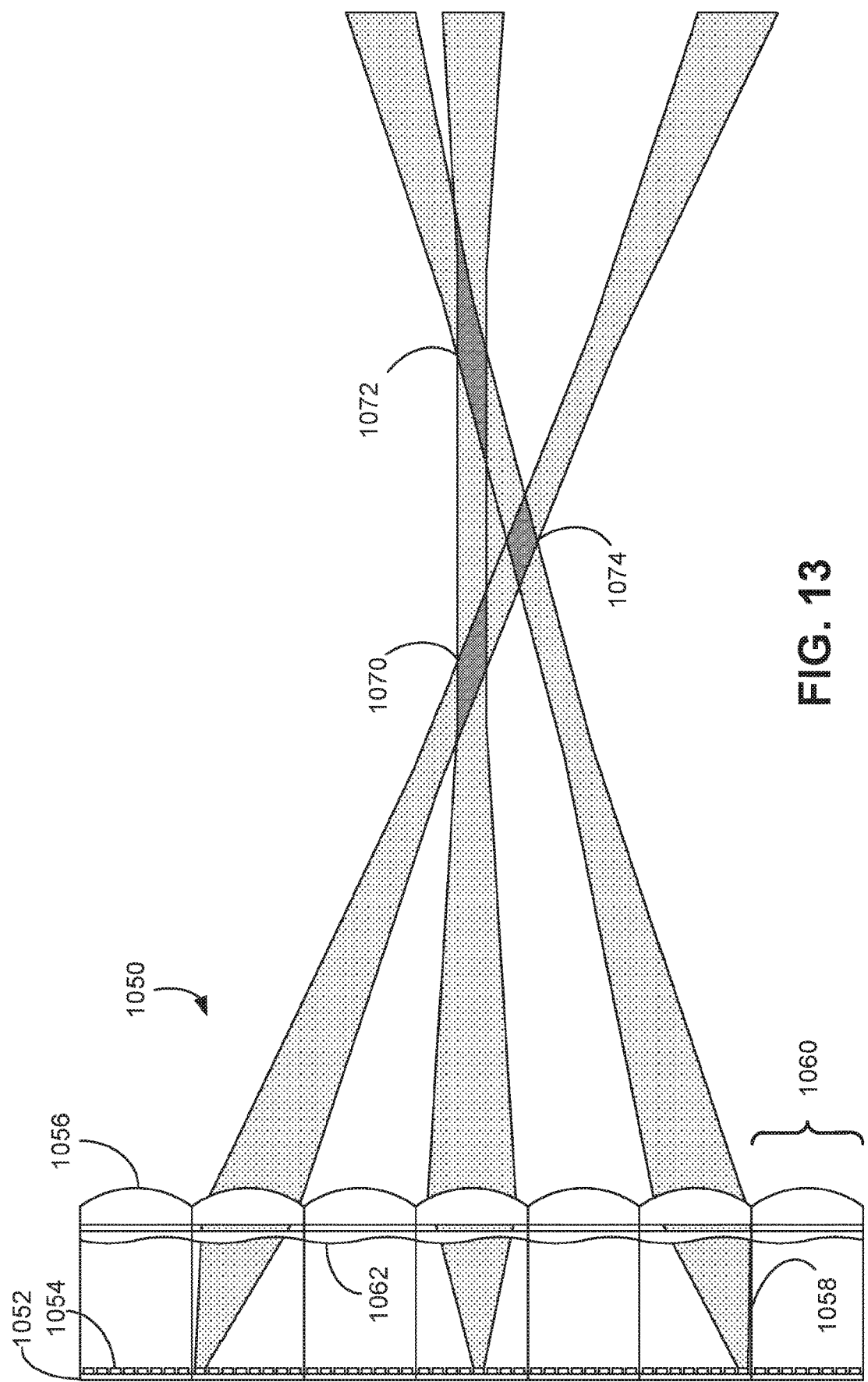
FIG. 13 is a schematic cross-sectional view of a display structure illustrating voxel formation in accordance with some embodiments.

FIG. 13 is a schematic representation of voxel formation using a display in accordance with some embodiments. As shown in the example, voxels can be formed using multiple crossing beams. For example, voxels may be formed at positions 1070, 1072, and 1074. Voxels can be formed at different distances both in front of and behind the display as well as on the display surface. Single beams with extended focus depths can be used for creating the correct eye retinal focus cues. It may be preferable for the FOVs of the individual beams to be kept small. Multiple beams crossing at the voxel positions may be used for covering the larger FOV of the viewer eye pair. This configuration may help the visual system correct for eye convergence. In this way, the generation of small light emission angles for single eye retinal focus cues and the generation of larger emission angles for eye convergence required for the stereoscopic effect are separated from each other in the optical structure. The arrangement makes it possible to control the two angular domains separately with the display's optical design. Voxel distances can be selected freely within the beam extended waist range. This configuration may be useful for providing continuous depth positions. Because single eye retinal focus cues may be created with single emitter beams, in some embodiments a voxel may be formed by utilizing only two beams from two emitters. This arrangement may be helpful in simplifying the task of rendering. In some embodiments, a voxel may be formed by utilizing a greater number of beams. For example, more beams may be used if wider eye-boxes or viewing zones are desired.

One factor to be considered in the design of a 3D display structure is that optical materials refract light with different wavelengths to different angles (color dispersion). This means that if three colored pixels (e.g. red, green and blue) are used, the different colored beams are tilted and focused to somewhat different directions and distances from the refractive features. In some embodiments, color dispersion may be compensated in the structure itself by using a hybrid layer where e.g. diffractive features are used for the color correction. As the colored sub-pixels can be spatially separated on the light-emitting layer, there can also be some small angular differences to the colored beam projection angles. If the projected images of the source components are kept small enough on the focal surface layers, the three colored pixels will be imaged next to each other and combined into full-color voxels by the eye in a manner analogous to what is seen with 2D screens where the colored sub-pixels are spatially separated. The colored sub pixel images of the 3D display structure are highly directional, and it may be useful to ensure that all three differently colored beams enter the eye through the pupil.

As explained previously, diffraction may also affect achievable resolution, e.g., in the case that the light emitter and microlens aperture sizes are very small. The depth range achievable with the light field display and rendering scheme may be affected by the quality of beam collimation coming from each sub-pixel. The sizes of the light emitting pixels, the size of the emission patterns, and the effective focal length of the light focusing features are three parameters that may affect collimation quality. In some embodiments, a continuous emitter matrix on the light-emitting layer allows for very wide FOVs. In order to reduce stray light effects, the baffle structures may be implemented inside each projection cell. This may limit the matrix size to the footprint of the projection cell. In this scenario, the FOV of a single cell FOV may not be easily extended. Additional light steering layers like electrowetting microprisms or LC-based components may be used in some embodiments to mitigate this problem as they may allow tilting of beams to larger angles.

3D Display Rendering Schemes

Several different kinds of rendering schemes can be used together with the presented display structures and optical methods. Depending on the selected rendering scheme, the realized display device may be a 3D light field display with multiple views and focal surfaces or a regular 2D display.

In some embodiments, a 3D rendering scheme creates several focal points or focal surfaces in front of the viewer(s) in front of or behind the physical display surface in addition to the multiple viewing directions. It may be useful to generate at least two projected beams for each voxel. Reasons for using at least two beams may include (i) that a single emitter inside the display should have an FOV that makes it visible to only one eye at any given time, and (ii) that the created voxel should have an FOV that covers both eyes simultaneously in order to create the stereoscopic view. The voxel FOV may be created as a sum of individual beam FOVs when more than one beam is used at the same time. For all voxels that are between the display and observer, it may be helpful to have the convergence beams cross in front of the display at the correct voxel distance. In a similar way, it may be helpful for the voxels positioned at a further distance from the observer than the display to have a beam pair virtually crossing behind the display. The crossing of the (at least) two beams helps to generate a focal point (or surface) that is not at the display surface only. It may be useful to have the separate beams focus to the same spot where they cross.

In some embodiments, beam waists are extended in order to provide a continuous depth range without resolution reduction. In some embodiments, sufficient retinal focus cues are created by employing rendering methods that use emitter pattern positioning for the correct beam angle selection. Use of the phase modulating optical feature and the whole wave-front coding method may lead to reduced contrast. Image rendering can be used in mitigating this effect. For example, the active source matrix pattern adjustment based on voxel depth can be used for optimizing the relation between bright central spot and contrast reducing veil around it. Extremely high dynamic range of µLEDs makes them ideal components for this particular use.

Rendering a truly continuous range of depths on a 3D display may involve heavy computation. In some embodiments, the 3D data may be reduced to certain discrete depth layers in order to reduce computational requirements. In some embodiments, discrete depth layers may be arranged close enough to each other to provide the observers visual system with a continuous 3D depth experience. Covering the visual range from 50 cm to infinity may take about 27 different depth layers, based on the estimated human visual system average depth resolution. In some embodiments, the presented methods and optical hardware allow creation of multiple focal surfaces that can be displayed at the same time (or inside the visual system POV timeframe). In some embodiments, observer positions may be actively detected in the device and voxels may be rendered to only those directions where the observers are located. In some embodiments, active observer eye tracking is used to detect observer positions (e.g., using near-infrared (NIR) light with cameras around or in the display structure).

One trade-off situation associated to the rendering scheme may be found between spatial/angular and depth resolutions. With a limited number of pixels and component switching speeds, emphasizing high spatial/angular resolution may have the cost of fewer focal planes (lower depth resolution). Conversely, having more focal planes for better depth resolution may come with the cost of a more pixelated image (low spatial/angular resolution). The same tradeoff may apply to the data processing at the system level, as more focal planes may involve more calculations and higher data transfer speeds. In the human visual system depth resolution decreases logarithmically with distance, which may allow for the reduction of depth information when objects are farther away. Additionally, the eyes can resolve only larger details as the image plane goes farther away, which may allow for the reduction of resolution at far distances. In some embodiments, rendering schemes are optimized by producing different voxel resolutions at different distances from the viewer in order to lower the processing requirements for image rendering. The tradeoffs connected to the rendering scheme may also be addressed on the basis of the presented image content, enabling, e.g., higher resolution or image brightness.

In some embodiments, three differently colored pixels are implemented on the light-emitting layer in order to create a full-color picture. The color rendering scheme may involve systems and/or methods to adapt to the fact that different colors are refracted to somewhat different angular directions at the optical components. In addition to a special color rendering scheme, some of this dispersion may be removed with hardware, e.g. by integrating diffractive structures for color correction. This is especially useful in compensating for the different beam focus distances, but the wave-front coding methods helps greatly in this task. An example color rendering scheme, in accordance with some embodiments, is to combine the output of three differently colored components with the phase modifying layer. In this case, the beam color can be selected with the LEL layer controls.

Amplitude Modulating Components Used for Focus Depth Extension

Figure 14:
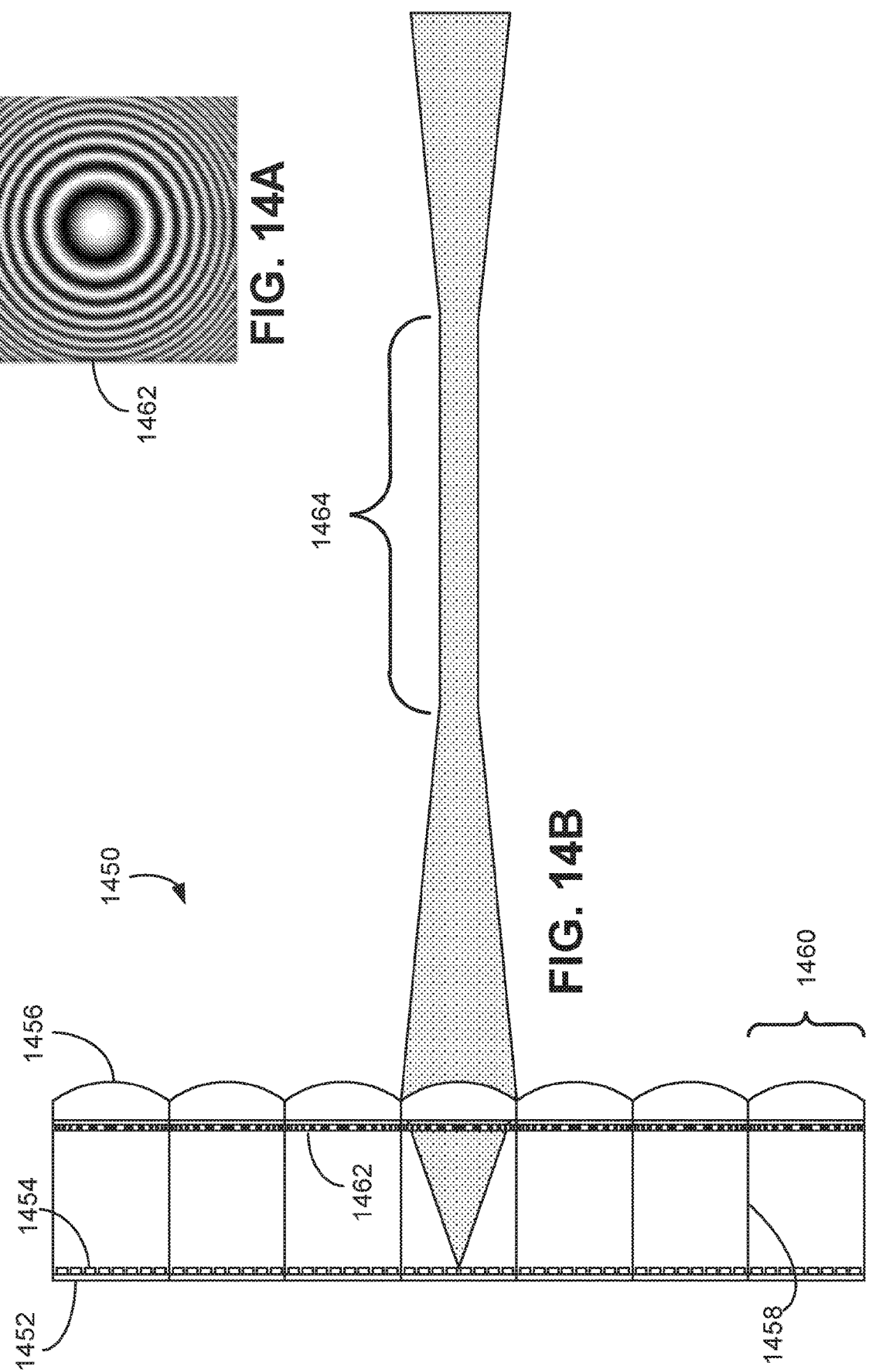
FIG. 14A illustrates an amplitude modulating component used in some embodiments.
FIG. 14B is a schematic cross-sectional view of a display structure using an amplitude modulating component in accordance with some embodiments.

In some embodiments, amplitude modulation is used for extending the beam waists. One example of such a component is the sinusoidal zone plate pattern depicted in FIG. 14A. FIG. 14B depicts an alternative display optical structure. The zone plate may use diffraction to focus light. A suitable combination of a zone plate and focusing optics may be used to extend the focus depth. The amplitude modulating element of the alternative display structure depicted in FIG. 14B may be positioned close to the projection cell aperture stop. The positioning of the modulating element in the example display structure may be similar to the positioning of phase modulating element previously described with respect to FIG. 10. The amplitude modulating element may operate as a special mask that absorbs light selectively. In contrast, the phase modulating elements pass all the incident light, as they operate to redirect the light instead of absorbing it.

FIG. 14B depicts a 3D display structure 1450 and its functionality, in accordance with some embodiments. As shown in the example in FIG. 14B, light is emitted from a layer 1452, which may be an addressable two-dimensional array of light-emitting elements 1454, which may be separately controllable small emitters, such as μLEDs. A lens structure 1456 (e.g. polycarbonate microlens sheet) overlaying the emitters collects and focuses the light into a set of beams that are used to form an image at different viewing directions. The emitters and lenses form a series of projection cells 1460 that are separated from each other with opaque baffle structures 1458 that suppress crosstalk between neighboring cells.

A layer of amplitude modulating elements 1462 placed proximate to the projection cell optics' principal plane (aperture stop) extends the beam waist from a single focus spot, determined by the lens focal length, to a range of depth values 1464 along the beam propagation path where the focused spot size remains almost constant, resulting in an extended beam waist.

Implementation Examples

Figure 15:
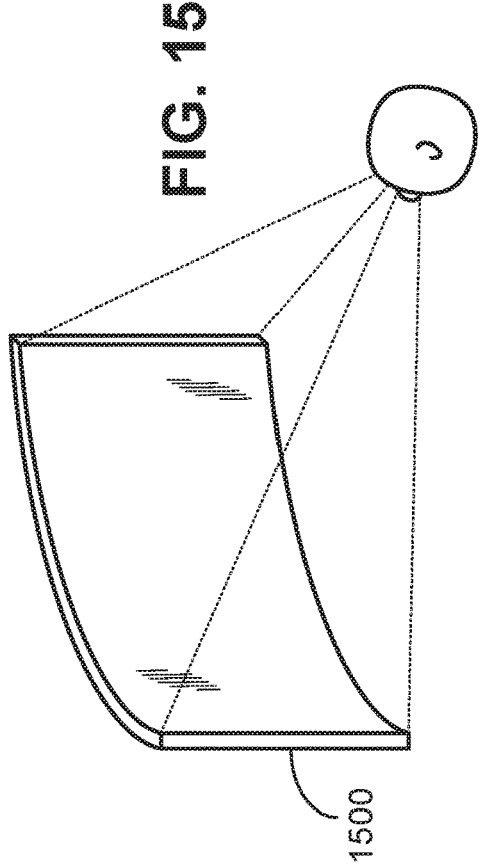
FIG. 15 depicts a use case of a wall-mounted display in accordance with some embodiments.

FIG. 15 depicts a use case of a wall-mounted 3D display 1500, in accordance with some embodiments. In the example, a large 87" wall-mounted 3D display is viewed from a distance of 2 m. The device is curved with a 2000 mm radius in order to make single display pixel emission patterns overlap at the viewer position. Single projection cells may emit light into an approximately 9° field of view. An approximately 320 mm wide viewing window is formed around the viewer eyes allowing adequate head and eye movements for a single user. The display may be monochromatic, and it may be used e.g. as design aid for complex 3D CAD drawings.

Figure 16:
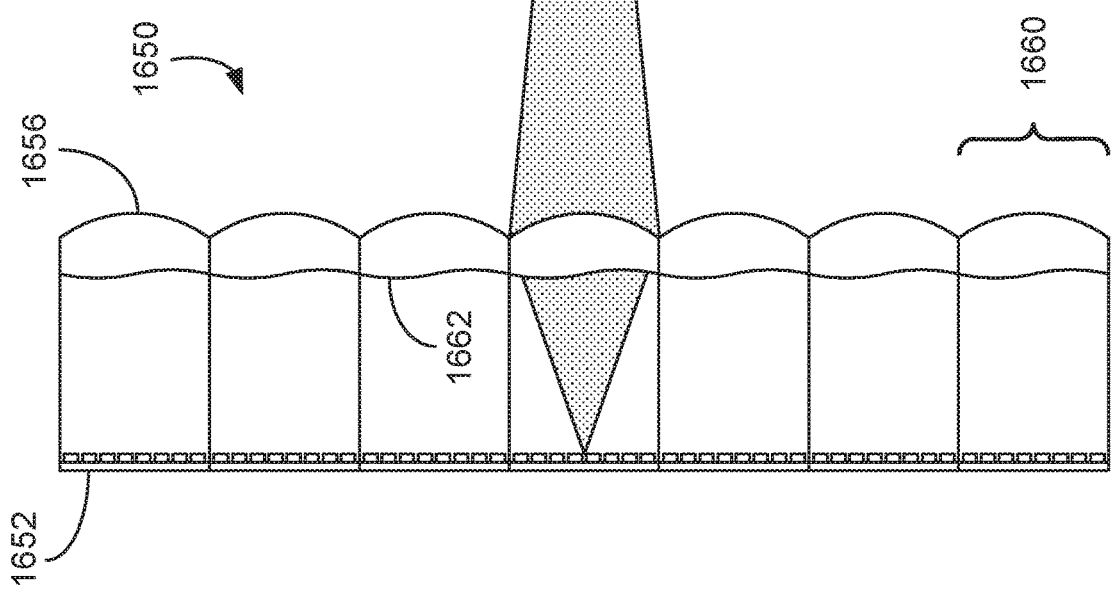
FIG. 16 is a schematic cross-sectional view of a display structure in accordance with some embodiments.

FIG. 16 is a schematic representation of the optical design of a display structure 1650, in accordance with some embodiments. The example of FIG. 16 shows light emitted from μLED arrays 1652 where the component size is 2 μm×2 μm and the pitch 3 μm. There are a total of 267×267 green μLED chips in each projection cell matrix 1660, which have a total width of 0.8 mm. Rotationally symmetric collimating microlenses 1656 are placed at 4.9 mm distance from the μLEDs. The array is made from optical plastic COP (Cyclo-olefin Polymer) as a hot-embossed 0.8 mm thick sheet. Aperture sizes of the collimating lenses are 1 mm and their focal length is 5 mm. With such measurements, the F #5 optical system gives a total FOV of 9.1° to each cell. Both horizontal and vertical beams may be created with the structure.

In the example of FIG. 16, a phase plate structure 1662 is integrated directly onto the back of the microlens sheet as an array with the same 1 mm pitch as the collimating lenses. This surface shape of the phase plate is cubic, and its sag follows the extended polynomial function of optical design software OpticStudio 18 by using the equation, $$z = \frac{cr^2}{1+\sqrt{1-(1+k)c^2r^2}} + \sum_{i=1}^{N} A_i E_i(x, y)$$

with parameter values c=0; r=0; k=0 (flat base surface); N=3 (cubic surface);
normalization radius=1.121; X3Y0=0.037; X0Y3=−0.037; and all other XNYN combinations=0. In some embodiments, the sag equation may be expressed as:

$z=(0.037)(x/1.21 \text{ mm})^3−(0.037)(y/1.21 \text{ mm})^3$ for x,y in units of mm.

It should be noted that this equation is provided as an example, and other phase plate structures with different sag equations may be used in different embodiments. In some embodiments, the optics of the phase plate are not rotationally symmetric. In some embodiments, a surface of the phase plate may have a form that can be described by a sum of a first function only of x and a second function only of y, e.g. of the form $z=f_x(x)+f_y(y)$, where the x and y axes are orthogonal to one another and to an optical axis (z). A surface having such a form may be referred to as having a rectangularly separable form. The functions may be monomial or polynomial functions, trigonometric functions (e.g. sine, cosine, tangent, and inverses thereof), exponential or logarithmic functions, or other functions. In some such embodiments, $f_x(x)=−f_y(y)$, such that a surface of the phase plate may be represented by $z=f(x)−f(y)$.

FIGS. 12A-12O above depict example pixel emission patterns, such as patterns that may be used with a cubic phase plate, in accordance with some embodiments. The pattern contains a matrix of μLEDs, and only some of them are activated at one time for the creation of one extended depth of field beam. In the pattern, a group of central μLEDs components have greater intensity than the components in the two "arms" that extend to the right and bottom sides of the matrix.

In order to test the structure functionality and achievable resolution on virtual image planes, a set of simulations was performed with the optical simulation software OpticStudio 18. The presented optical structure was placed at 2 m distance from a simplified eye model. One beam was directed to the eye model pupil that was 5 mm in diameter. The eye lens was focused to five different distances (1.25 m, 1.625 m, 2.5 m, 3 m and 5 m) in order to test what kinds of retinal images can be obtained with the optical system and with different eye adaptation distances around the display. Three different source-lens configurations were simulated in order to see the effects of the phase plate shape and emitter pattern in comparison to a simple setup where only one μLED and collimator lens without the phase plate is used. In this latter case, the collimating lens was identical to the lens of the presented optical structure's design.

Simulations of a single 2 μm×2 μm source without the phase plate resulted in simulated retinal images whose size depends strongly on the eye focus distance. Simulations with the same source and same lens but with the added integrated cubic phase modulating shape result in simulated retinal images that have more complex shapes but that also have a very small area where most of the light energy is concentrated. The size of this central spot remains almost constant over the whole simulated eye focus range. These simulations indicate that the phase plate has made the beam largely focus invariant within an extended focus range. Source patterns similar to those illustrated in FIGS. 12A-12O were also simulated. Such patterns provide spots with clear internal structure where the intensity maxima are also at slightly different positions depending on the eye focal distance. This simulation shows that by suitable balancing of the μLED intensities in a pattern, it is possible to somewhat balance out the spot size differences for a more even voxel resolution through the depth range. This also shows that it is possible to shift the highest intensity positions slightly onto the eye retina for better voxel positional accuracy.

Further Embodiments

While some example embodiments are described above as being used to provide a light field display, it should be noted that other embodiments may be used in other types of displays, such as multiview displays or other directional displays.

In some embodiments, an apparatus is provided for image display. The apparatus includes an addressable array of light-emitting elements; a phase-modifying layer; and an array of collimating optical elements. The phase-modifying layer is arranged between the addressable array of light-emitting elements and the array of collimating optical elements.

In some embodiments, the addressable array of light-emitting elements includes a plurality of sets of light-emitting elements; wherein each collimating optical element of the array of collimating optical elements is associated with a particular set of light-emitting elements of the plurality of sets of light-emitting elements.

In some embodiments, the apparatus further includes baffles for blocking light from each set of light-emitting elements from reaching collimating optical elements other than the collimating optical element associated with the particular set of light-emitting elements.

In some embodiments, the phase-modifying layer comprises a plurality of phase plates, such as cubic phase plates.

In some embodiments, an image display apparatus includes a plurality of projection cells, each projection cell comprising: an addressable array of light-emitting elements; a converging or diverging optical element along an optical path from the light-emitting elements to an exterior of the display apparatus; and a phase-modifying optical element along the optical path.

In some embodiments, the plurality of projection cells are arranged in a two-dimensional array. The converging optical element may include a collimating lens. In some embodiments, the phase-modifying optical element is a first surface of a combined optical element and the converging lens is a second surface of the combined optical element.

In some embodiments, the phase-modifying optical element includes a phase plate. The phase plate may be a cubic phase plate, a quartic phase plate, an exponential phase plate, a logarithmic phase plate, a sinusoidal phase plate, or a freeform phase plate.

In some embodiments, an image display method includes emitting light from an addressable array of light-emitting elements; modifying the phase of the light with a phase-modifying layer; and collimating the phase-modified light.

Note that various hardware elements of one or more of the described embodiments are referred to as "modules" that carry out perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (e.g., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A light field display apparatus comprising:
a plurality of projection cells, configured to generate respective light beams, wherein a cell of the plurality of projection cells comprises:
an addressable array of light-emitting elements, configured to selectively emit light from one of the light-emitting elements;
a lens, along an optical path from the light-emitting elements to an exterior of the display apparatus, configured to collimate the emitted light, generating a light beam having a focus depth, associated with a beam waist of the light beam, at a focal length of the lens; and
a phase-modifying optical element along the optical path, configured to extend the beam waist along a propagation path of the light beam by modifying the phase of the emitted light, the extended beam waist is associated with a range of focus depth values.

2. The apparatus of claim 1, wherein the phase-modifying optical element comprises a phase plate.

3. The apparatus of claim 2, wherein the phase plate is a cubic phase plate.

4. The apparatus of claim 2, wherein the phase plate is selected from the group consisting of a quartic phase plate, an exponential phase plate, a logarithmic phase plate, and a sinusoidal phase plate.

5. The apparatus of claim 1, wherein the phase-modifying optical element has a surface with a rectangularly separable form.

6. The apparatus of claim 1, wherein the phase-modifying optical element has a surface with a form representable by $z=f(x)-f(y)$, where z is a position along an optical axis and x and y are positions along axes orthogonal to z and to one another.

7. The apparatus of claim 1, wherein the phase-modifying optical element is not rotationally symmetric.

8. The apparatus of claim 1, wherein the phase-modifying optical element is between the addressable array of light-emitting elements and the collimating lens.

9. The apparatus of claim 1, wherein the phase-modifying optical element is a first surface of a combined optical element and the lens is a second surface of the combined optical element.

10. The apparatus of claim 1, further comprising baffles for blocking light between adjacent projection cells.

11. The apparatus of claim 1, wherein cells of the plurality of projection cells are arranged in a two-dimensional array.

12. The apparatus of claim 1, wherein a voxel to be displayed is formed at a depth value, within the range of focus depth values, by crossing the light beam at the depth value with another light beam that is generated by another cell of the plurality of projection cells.

13. A light field display method, comprising:
selectively emitting light from a light-emitting element in an addressable array of light-emitting elements;
collimating the emitted light, by a respective lens, generating a light beam having a focus depth, associated with a beam waist of the light beam, at a focal length of the respective lens; and
extending the beam waist along a propagation path of the light beam by modifying the phase of the emitted light with a phase-modifying optical element, the extended beam waist associated with a range of focus depth values.

14. The method of claim 13, wherein the phase-modifying optical element comprises a phase plate.

15. The method of claim 14, wherein the phase plate is selected from the group consisting of a cubic phase plate, a quartic phase plate, an exponential phase plate, a logarithmic phase plate, and a sinusoidal phase plate.

16. The method of claim 13, wherein the phase-modifying optical element has a surface with a rectangularly separable form.

17. The apparatus of claim 1, wherein positions of the lens and the phase-modifying optical element are fixed.

18. The apparatus of claim 1, wherein the phase-modifying optical element is between the addressable array of light-emitting elements and the lens.

19. The method of claim 13, further comprising:
forming a voxel to be displayed at a depth value, within the range of focus depth values, by crossing the light beam at the depth value with another light beam that is generated by a respective lens from a light selectively emitted from a light-emitted element in the addressable array of light-emitting elements.

* * * * *